United States Patent
Engstrand et al.

(10) Patent No.: US 11,512,985 B2
(45) Date of Patent: Nov. 29, 2022

(54) CONTROL SYSTEM AND METHOD FOR DETECTING A POSITION OF A MOVABLE OBJECT

(71) Applicant: Phaedrus, LLC, Hartford, WI (US)

(72) Inventors: Bradley W. Engstrand, Hartford, WI (US); Are Torr Engstrand, Lincoln, NE (US)

(73) Assignee: PHAEDRUS, LLC, Hartford, WI (US)

( * ) Notice: Subject to any disclaimer, the term of this patent is extended or adjusted under 35 U.S.C. 154(b) by 120 days.

(21) Appl. No.: 16/653,400

(22) Filed: Oct. 15, 2019

(65) Prior Publication Data

US 2020/0191612 A1    Jun. 18, 2020

Related U.S. Application Data

(63) Continuation-in-part of application No. 16/148,542, filed on Oct. 1, 2018, which is a continuation of
(Continued)

(51) Int. Cl.
*G01D 5/30* (2006.01)
*G01D 5/28* (2006.01)
*G01S 17/66* (2006.01)

(52) U.S. Cl.
CPC ............. *G01D 5/30* (2013.01); *G01D 5/285* (2013.01); *G01S 17/66* (2013.01)

(58) Field of Classification Search
CPC .................................. G01D 5/30; G01D 5/285
See application file for complete search history.

(56) References Cited

U.S. PATENT DOCUMENTS

| 4,204,115 A | 5/1980 | Boldridge, Jr. |
| 4,319,134 A | 3/1982 | Weber |

(Continued)

FOREIGN PATENT DOCUMENTS

JP      H06265370      9/1994

OTHER PUBLICATIONS

International Search Report and the Written Opinion cited in the corresponding International Application No. PCT/US19/56261; dated Jan. 14, 2020; 11pp.

(Continued)

*Primary Examiner* — Thanh Luu
(74) *Attorney, Agent, or Firm* — Lempia Summerfield Katz LLC

(57) ABSTRACT

A timing apparatus, system, and method are provided to determine a position of a rotating object in a device, such as an engine, and control the device according to the determined position of the rotating object. Light is emitted from a light source onto a reflecting region on a portion of the rotating object. Light is reflected off the reflecting region of the rotating object and detected as the rotating object rotates. Intensity of the reflected light is measured, via a microcontroller, and the position of the rotating object is determined according to the intensity of the detected light. A signal is generated that corresponds to the intensity of the detected light associated with the determined position of the rotating shaft. The reflecting region has a feature configured to effect a change in the intensity of the reflected light as the rotating object rotates. The microcontroller is configured to determine the determined position and to utilize the determined position and the change in the signal to control operating characteristics of the device.

18 Claims, 14 Drawing Sheets

Related U.S. Application Data application No. 14/708,742, filed on May 11, 2015, now Pat. No. 10,132,655.

(60) Provisional application No. 62/745,968, filed on Oct. 15, 2018, provisional application No. 61/991,702, filed on May 12, 2014.

(56) References Cited

U.S. PATENT DOCUMENTS

| | | | |
|---|---|---|---|
| 4,866,269 A * | 9/1989 | Wlodarczyk | F02D 41/0097 250/237 G |
| 5,001,937 A | 3/1991 | Bechtel et al. | |
| 5,471,054 A | 11/1995 | Watanabe | |
| 5,983,720 A | 11/1999 | Crabb et al. | |
| 6,204,499 B1 | 3/2001 | Schaefer | |
| 6,305,234 B1 * | 10/2001 | Thies | G01D 5/34776 73/865.9 |
| 6,872,933 B2 | 3/2005 | Wirthlin | |
| 7,388,188 B2 | 6/2008 | Engstrand | |
| 7,820,956 B2 | 10/2010 | Sidor et al. | |
| 8,395,111 B2 | 3/2013 | Phan Le | |
| 8,487,237 B2 | 7/2013 | Watanabe et al. | |
| 8,508,726 B2 | 8/2013 | Benner, Jr. | |
| 8,836,956 B2 | 9/2014 | Jarisch et al. | |
| 2002/0170187 A1 * | 11/2002 | Kirschbaum | G01D 5/3473 33/1 AP |
| 2006/0016970 A1 | 1/2006 | Nagasaka et al. | |
| 2009/0152452 A1 | 6/2009 | Lee et al. | |
| 2011/0139971 A1 | 6/2011 | Phillips | |
| 2011/0240836 A1 | 10/2011 | Phan Le | |
| 2012/0126103 A1 | 5/2012 | Yamamoto | |
| 2012/0285428 A1 * | 11/2012 | Kuroki | F02M 21/0206 123/568.21 |
| 2015/0323671 A1 | 11/2015 | Engstrand | |

OTHER PUBLICATIONS

International Search Report and Written Opinion 08072015, International Searching Authority; dated Aug. 7, 2015; 17 pages.

\* cited by examiner

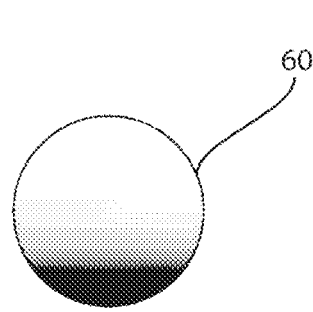 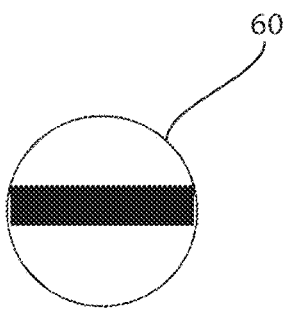 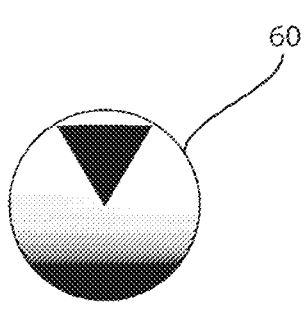
FIG. 3A　　　　FIG. 3B　　　　FIG. 3C
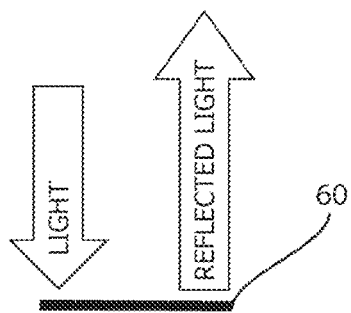 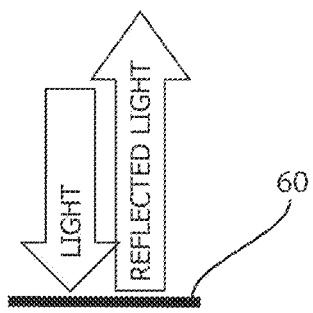 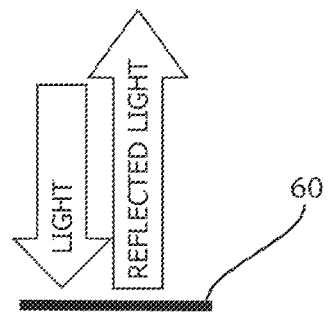
FIG. 4A　　　　FIG. 4B　　　　FIG. 4C

CONTROL SYSTEM AND METHOD FOR DETECTING A POSITION OF A MOVABLE OBJECT

RELATED APPLICATION DATA

This patent is entitled to the benefit of and claims priority to co-pending U.S. Provisional Application Ser. No. 62/745,968 filed Oct. 15, 2018 and entitled "Control System and Method for Detecting a Position of a Movable Object," and is entitled to, as a continuation-in-part of, the benefit of and claims priority to co-pending U.S. application Ser. No. 16/148,542 filed Oct. 1, 2018 and entitled "Apparatus, System and Method for Detecting a Position of a Movable Object in a Device and Using the Same for Controlling the Device," which claimed the benefit of and priority to U.S. application Ser. No. 14/708,742 filed on May 11, 2015, now issued as U.S. Pat. No. 10,132,665 and entitled "Apparatus, System and Method for Detecting a Position of a Movable Object in a Device and Using the Same for Controlling the Device," and which claimed priority to and the benefit of U.S. Provisional Application No. 61/991,702 filed May 12, 2014. The entire contents of these prior filed applications are hereby incorporated herein by reference.

BACKGROUND

The present disclosure generally relates to an apparatus, a system and a method for detecting position in movable objects. More specifically, the present disclosure relates to an apparatus, a system and a method for detecting position of a movable object in a device and using the same for controlling the device.

The apparatus, the system and the method for detecting a position and/or an intensity of emitted light may have a sensor array in a compartment. The sensor array can detect an intensity of emitted light from a light source in a compartment. The sensor array may emit a light, may detect a light, may detect a temperature of air and/or may detect a pressure of air in the compartment. The intensity of emitted light, which may be detected by the sensor array, may correspond to a position of a movable element within an interior of the compartment. A microprocessor may determine and/or may calculate the position of the movable element within the compartment based on the intensity of emitted light detected by the sensor array. The intensity of the emitted light may be based on an amount of the emitted light, which may or may not be absorbed by an interior of the compartment and/or by the movable element. The microprocessor may monitor strength of the emitted light from the light source for compensating or for correcting the sensor array based on the strength of the emitted light from the light source. An output device may be connected to the microprocessor and/or may display information based on the intensity of emitted light detected by the sensor array, a pressure of air in the compartment, a temperature of the air in the compartment, the position of the movable element, and/or the strength of the emitted light from the light source.

It is, of course, generally known to measure and/or to detect a position of a movable element in a compartment. The position of the movable element in the compartment may correspond to a location of a machine element, which may be connected to and/or may be attached to the movable element. The machine element may be, for example, a piston in a cylinder or a tab connected to a machine part. Monitoring the position of the movable element in the compartment may lead to detection of irregularities within the machine element or machine part as well as an indication of the overall efficiency of the machine element or machine part. Also, monitoring the position of the movable element may enable the detection and/or calculation of the speed and/or any derivation of speed, such as acceleration, of the machine element or machine part.

Typically, a first sensor in the compartment or adjacent to the movable element must contact the movable element to detect, to determine, and/or to measure the position of the movable element with respect to the compartment. The position of the movable element in the compartment may correspond to a position of the machine element and/or the machine part with respect to the compartment. A second sensor may be required to be attached to, to be connected to, and/or to contact the movable element, the machine element, and/or the machine part to increase an accuracy of the first sensor for detecting and/or for measuring the position of the movable element.

However, contact between the movable element and the first sensor may cause the first sensor to inaccurately detect and/or to inaccurately measure the position of the movable element in the compartment. Further, contact between the movable element and the first sensor may damage and/or may destroy the movable element and/or the first sensor. As a result, the first sensor may be inoperable and/or may inaccurately detect and/or may inaccurately measure the position of the movable element in the compartment. Moreover, contact between the second sensor and the movable element, the machine element, and/or the machine part may damage and/or may destroy the second sensor, the movable element, the machine element, and/or the machine part. As a result, the second sensor may be inoperable and/or may be incapable of increasing the accuracy of the first sensor.

A need, therefore, exists for an apparatus, a system, and a method for detecting a position and/or an intensity of emitted light. Additionally, a need exists for an apparatus, a system, and a method for detecting a position and/or an intensity of emitted light, where the apparatus, system, or method have a sensor array within a compartment for detecting a position of a movable element in the compartment. Further, a need exists for an apparatus, a system, and a method for detecting a position and/or an intensity of emitted light, where the apparatus, system, or method may detect and/or may measure an intensity of emitted light unabsorbed by an interior surface of the compartment and/or by a movable element in the compartment. Still further, a need exists for an apparatus, a system, and a method for detecting a position and/or an intensity of emitted light, where the apparatus, system, or method may have a sensor array and/or a microprocessor to calculate and/or to determine a position of a movable element in a compartment based on an intensity of emitted light in the compartment.

SUMMARY

Moreover, a need exists for an apparatus, a system, and a method for detecting a position and/or an intensity of emitted light, where the apparatus, system, and method will not require contact between a sensor array and a movable element in a compartment to determine the position of the movable element in the compartment. Also, a need exists for an apparatus, a system, and a method for detecting a position of a movable object in a device and using the same for controlling the device.

The present disclosure relates to an apparatus, a system, and a method for detecting position of movable objects. More specifically, the present disclosure relates to an apparatus, a system, and a method for detecting position of a movable object as part of a device and using the same for controlling the device.

In one example according to the teachings of the present disclosure, a system is provided for determining a position of a rotating object in a device and for controlling the device according to the determined position or any derivation of the determined position (hereinafter the "determined position"). The system includes a reflecting region on the rotating object and a light source located in, on, or as a part of the device. Emitted light is emitted by the light source onto the reflecting region and reflected light is reflected off the rotating object, whereby the reflected light has an intensity. The system also includes a detector that detects the reflected light and measures the intensity of the reflected light. The system also includes a microcontroller configured to control the device according to the determined position. The reflecting region has a feature configured to effect a change in the intensity of the reflected light as the rotating object rotates. The change in the intensity of the reflected light corresponds to a change in a signal associated with a determined position of the rotating object. The microcontroller is configured to determine the determined position and to utilize the determined position and the change in the signal to control operating characteristics of the device.

In one example, the rotating object can comprise at least one portion of a shaft.

In one example, the rotating object can be positioned adjacent to the light source.

In one example, the light source can be a QVLA® light emitting diode and the detector can be a QVLA® sensor.

In one example, the feature of the reflecting region from which the reflected light is reflected can vary according to the position of the rotating object with respect to the light source during the rotation of the shaft.

In one example, the signal can vary according to the feature of the reflecting region from which the reflected light is reflected that is adjacent the light source.

In one example, the feature of the reflecting region can be a color gradient, an image pattern, a material, or a texture of the reflecting region on the rotating object. The feature can vary over a surface area of the reflecting region.

In one example, the feature of the reflecting region can be a spiral surface around the rotating object. The signal can be generated by determining a distance between a location on the spiral surface and the light source as the rotating object rotates. The distance can vary according to the portion of the spiral surface adjacent to the light source. The change in the intensity of the detected light can correspond to a change in the signal.

In one example, the distance between the spiral surface and the light source can vary in a radial direction from an axis of the rotating object.

In one example, the distance between the spiral surface and the light source can vary in an axial direction relative to an axis of the rotating object.

In one example, the device can be an engine and the engine can include an engine control unit (ECU). The microcontroller can be a part of the ECU or can be separate from but coupled to the ECU. The ECU can be coupled to the detector and can be configured to determine the determined position of the rotating object in, on, or as a part of the engine according to the signal.

In one example, the microcontroller can be an ECU of an engine and can be configured to adjust a timing of the engine according to the determined position of the rotating object.

In one example, the microcontroller can be an ECU of an engine and can be configured to adjust the timing of the engine at any position of the rotating object within one revolution.

In one example according to the teachings of the present disclosure, a timing apparatus is disclosed for determining a position of a rotating shaft in an engine. The timing apparatus includes a reflecting region on a portion of the rotating shaft and a light source located in, on, or as a part of the engine. Emitted light is emitted by the light source onto the reflecting region and reflected light is reflected off the rotating shaft, whereby the reflected light has an intensity. The timing apparatus also includes a detector that detects the reflected light and measures the intensity of the reflected light and a microcontroller coupled to the detector and configured to determine the position of the rotating shaft in the engine according to a change in the intensity of the detected light and to control the engine. The reflecting region has a feature configured to effect the change in the intensity of the reflected light as the rotating shaft rotates. The change in the intensity of the reflected light corresponds to a change in a signal associated with a determined position of the rotating shaft. The microcontroller is configured to determine the determined position and to utilize the determined position and the change in the signal to control operating characteristics of the engine.

In one example according to the teachings of the present disclosure, a method is disclosed for determining a position of a rotating object in an engine and controlling the engine according to the determined position of the rotating object. The method includes the steps of: emitting light from a light source onto a reflecting region on a portion of the rotating object; reflecting light off the reflecting region of the rotating object; detecting the reflected light off the reflecting region as the rotating object rotates; measuring an intensity of the reflected light; determining, via a microcontroller, the position of the rotating object according to the intensity of the detected light; and generating a signal that corresponds to the intensity of the detected light associated with the determined position of the rotating shaft. The reflecting region has a feature configured to effect a change in the intensity of the reflected light as the rotating object rotates and the microcontroller is configured to determine the determined position and to utilize the determined position and the change in the signal to control operating characteristics of the device.

In one example, the operating characteristics of the foregoing system, apparatus, and method can be any one or more of: a) adjusting the fuel amount delivered to a cylinder of the engine; b) adjusting the fuel amount delivered to the cylinder of the engine at each revolution of the engine; c) adjusting the fuel delivery timing to a cylinder of the engine; d) adjusting the fuel delivery timing to the cylinder of the engine at each revolution of the engine; e) adjusting the spark ignition timing to a cylinder of the engine; f) adjusting the spark ignition timing to the cylinder of the engine at each revolution of the engine; g) adjusting the spark ignition duration to a cylinder of the engine; h) adjusting the spark ignition duration to the cylinder of the engine at each revolution of the engine; i) determining a top dead center (TDC) position of a cylinder of the engine; j) determining the TDC position of the cylinder of the engine at each revolution of the engine; k) determining a fuel quality within a cylinder of the engine; l) determining the fuel quality within the cylinder of the engine at each revolution of the engine; m) determining a power stroke for a cylinder of the engine; n) determining the power stroke for the cylinder of the engine at each revolution of the engine; o) adjusting the fuel/air mixture or stoichiometry for a cylinder of the engine; p) adjusting the fuel/air mixture or stoichiometry for the cylinder of the engine at each revolution of the engine; q) storing historical engine and cylinder data and, utilizing such stored data for diagnosing wear of one or more engine components, identifying a leaky valve, distinguishing between a leaky intake or exhaust valve, predicting failure of one or more engine components, diagnosing crankshaft misalignment, diagnosing crankshaft and/or camshaft bearing wear or failure, and/or determining whether one cylinder is producing more or less power compared to another cylinder of the engine; and/or r) monitoring and/or diagnosing other functional aspects of an entire vehicle or device, aside from an engine or motor, such as diagnosing a dragging brake as a reaction of the motor and sending a warning regarding same.

It is, therefore, an advantage of the present disclosure to provide an apparatus, a system, and a method for detecting a position of a movable object in a device and using the same for controlling the device.

An advantage of the present disclosure is to provide an apparatus, a system, and a method for detecting a position of a movable object in a device and using the same for controlling the device, whereby parts of the apparatus, system, and method are constructed of materials and/or components that do not interfere with the operation of the device.

Another advantage of the present disclosure is to provide an apparatus, a system, and a method for detecting a position of a movable object in a device and using the same for controlling the device in a manner which may allow a user to adjust the timing of the device.

A further advantage of the present disclosure is to provide an apparatus, a system, and a method for detecting a position of a movable object in a device and using the same for controlling the device in a manner which may allow a user to adjust the timing of the engine for optimizing performance and efficiency.

Another advantage of the present disclosure is to provide an apparatus, a system, and a method for detecting a position of a movable object in a device and using the same for controlling the device in a manner which may allow a user to adjust the operation of the device.

A further advantage of the present disclosure is to provide an apparatus, a system, and a method for detecting a position of a movable object in a device and using the same for controlling the device in a manner which may allow a user to optimize the performance of the device.

Moreover, an advantage of the present disclosure is to provide an apparatus, a system, and a method for detecting a position of a movable object in a device and using the same for controlling the device in a manner which may be used without causing harm to the device while in use.

Another advantage of the present disclosure is to provide an apparatus, a system, and a method for detecting a position of a movable object in a device and using the same for controlling the device in a manner which may be used to maximize the efficiency of the device.

Another advantage of the present disclosure is to provide an apparatus, a system, and a method for detecting a position of a movable object in a device and using the same for controlling the device, whereby parts of the apparatus, system, and method have reliability.

Yet another advantage of the present disclosure is to provide an apparatus, a system, and a method for detecting a position of a movable object in a device and using the same for controlling the device, whereby parts of the apparatus, system, and method have a long operating life.

A further advantage of the present disclosure is to provide an apparatus, a system, and a method for detecting a position of a movable object in a device and using the same for controlling the device, whereby parts of the apparatus, system, and method have low maintenance requirements.

Another advantage of the present disclosure is to provide an apparatus, a system, and a method for detecting a position of a movable object in a device and using the same for controlling the device, whereby parts of the apparatus, system, and method may operate in environments of electrical fields to one million volts at nine hundred thousand amps with no effect.

A further advantage of the present disclosure is to provide an apparatus, a system, and a method for detecting a position of a movable object in a device and using the same for controlling the device, whereby parts of the apparatus, system, and method have a frequency response greater than twenty-five kHz.

Moreover, an advantage of the present disclosure is to provide an apparatus, a system, and a method for detecting a position of a movable object in a device and using the same for controlling the device, whereby the apparatus, system, and method may detect the position of the object traveling at any speed.

An advantage of the present disclosure is to provide an apparatus, a system, and a method for detecting a position of a movable object in a device and using the same for controlling the device, whereby the apparatus, system, and method are capable of use in various environmental conditions.

A further advantage of the present disclosure is to provide an apparatus, a system, and a method for detecting a position of a movable object in a device and using the same for controlling the device, whereby the apparatus, system, and method have no magnets or coils, extremely low electrical noise, and have parts that inherently weld field immune.

Still further, an advantage of the present disclosure is to provide an apparatus, a system, and a method for detecting a position of a movable object in a device and using the same for controlling the device, whereby the apparatus, system, and method are capable of use with fiber optic systems.

Yet another advantage of the present disclosure is to provide an apparatus, a system, and a method for detecting a position of a movable object in a device and using the same for controlling the device, whereby the apparatus, system, and method are relatively inexpensive.

An advantage of the present disclosure is to provide an apparatus, a system, and a method for detecting a position of a movable object in a device and using the same for controlling the device, which has a target, wherein a physical shape of the target can be changed to meet the needs of electronic signaling.

Another advantage of the present disclosure is to provide an apparatus, a system, and a method for detecting a position of a movable object in a device and using the same for controlling the device, which has a target, wherein a physical texture of the target can be changed to meet the needs of electronic signaling.

A further advantage of the present disclosure is to provide an apparatus, a system, and a method for detecting a position of a movable object in a device and using the same for controlling the device, which has a target, wherein a physical light gradient of the target can be changed to meet the needs of electronic signaling.

Yet another advantage of the present disclosure is to provide an apparatus, a system, and a method for detecting a position of a movable object in a device and using the same for controlling the device, which has a target, wherein a physical shape of the target can be changed relative to more than one axis.

Still further, an advantage of the present disclosure is to provide an apparatus, a system, and a method for detecting a position of a movable object in a device and using the same for controlling the device, which has a target, wherein a physical composition of the target can be changed.

Additional features and advantages of the present disclosure are described in, and will be apparent from, the detailed description of the disclosed embodiments and from the drawings.

BRIEF DESCRIPTION OF THE DRAWINGS

FIGS. 3A 3B and 3C illustrate schematic views of gradient targets in accordance with an embodiment of the present disclosure.

FIGS. 4A, 4B and 4C illustrate schematic views of relative positions of a light emitter and a light detector in accordance with an embodiment of the present disclosure.

DETAILED DESCRIPTION OF THE EMBODIMENTS

The present disclosure relates to an apparatus, a system, and a method for detecting a position of a movable object in a device and using the same for controlling the device.

This application hereby incorporates by reference U.S. Pat. No. 7,388,188 B2 entitled "Apparatus, system and method for detecting a position of a movable element in a compartment" and U.S. Pat. Nos. 8,436,287 B2, 8,115,185 B2, 7,935,916 B2 and 7,626,153 each entitled "System and/or method for reading, measuring and/or controlling intensity of light emitted from an LED" in their entirety in this disclosure.

In view of and with reference to the disclosures of U.S. Pat. Nos. 7,388,188 B2, 8,436,287 B2, 8,115,185 B2, 7,935, 916 B2 and 7,626,153, embodiments of the present disclosure may provide an apparatus, a system, and a method for detecting a position of a movable object in a device and using the same for controlling the device. In an embodiment, an apparatus, a system, and a method for detecting position of a movable object in a device and using the same for controlling the device may detect the position of an object on a rotating crankshaft within an engine. The position of the object may be used to adjust the timing of the engine for optimizing performance and/or efficiency. The object may be a magnet or other object connected to the crankshaft. In another embodiment, the object may be a marking on the crankshaft.

Typically, for example, an engine may have a reciprocating piston in a cylinder. The piston may be connected to a rotating crankshaft by a connecting rod. The engine may be a two-stroke or a four-stroke gas combustion engine. The engine may also have multiple pistons operating in respective cylinders. For example, the engine may have between three and sixteen cylinders. The cylinders may be arranged in a line or in a V-shape. The cylinders may also be horizontally opposed. The engine may provide power to drive a vehicle, a boat, a machine and/or the like.

Figure 1:
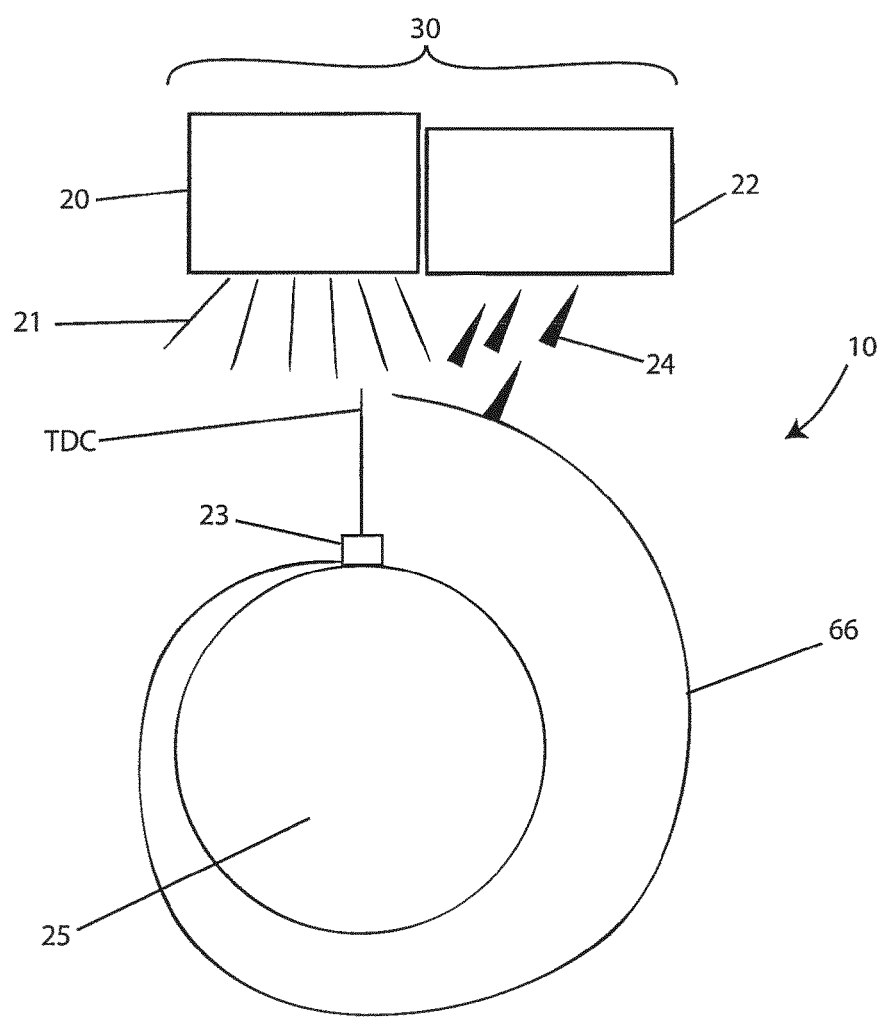
FIG. 1 illustrates a schematic view of a system for detecting position of a movable object in a device and using the same for controlling the device in accordance with an embodiment of the present disclosure.

Referring now to the drawings, wherein like numerals refer to like parts, FIG. 1 illustrates an embodiment of a system 10 for detecting position of a rotating object in a device. The system 10 may have a light source 20, such as a QVLA® (a registered trademark of Motion Controls LLC) light source. For example, the light source 20 may be a light emitting diode, "LED". The system 10 may also have a light detector 22, such as a QVLA® light detector.

The light source 20 may provide an emitted light beam 21. The emitted light beam 21 from the light source 20 may impinge upon a movable object 23. The movable object 23 may be, for example, a tab, a magnet, a marking and/or the like. In an embodiment, the movable object 23 may be mounted to and/or may be connected to a crankshaft 25 as shown in FIG. 1. However, the crankshaft 25 may be a camshaft or other rotating shaft which may be connected within an engine (not shown). Other shafts may also be used in other applications than in an engine. The present disclosure is not intended to be limited to crankshafts 25 in engines.

Also, a reflected light beam 24 may reflect from the movable object 23 on the crankshaft 25. The reflected light beam 24 may impinge on the light detector 22. The light source 20 and the light detector 22 may be collectively referred to herein as a sensor 30, such as a QVLA® sensor. The system 10 may operate in a manner as disclosed in U.S. Pat. Nos. 7,388,188 B2; 8,436,287 B2; 8,115,185 B2; 7,935, 916 B2 and 7,626,153.

Figure 2A:
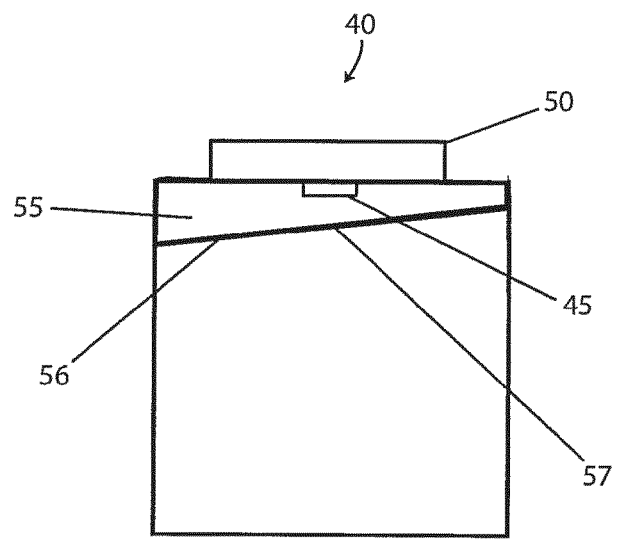
FIG. 2A illustrates a schematic side view of a rotational sensor for use in a system for detecting position of a movable object in a device and using the same for controlling the device in accordance with an embodiment of the present disclosure.
Figure 2B:
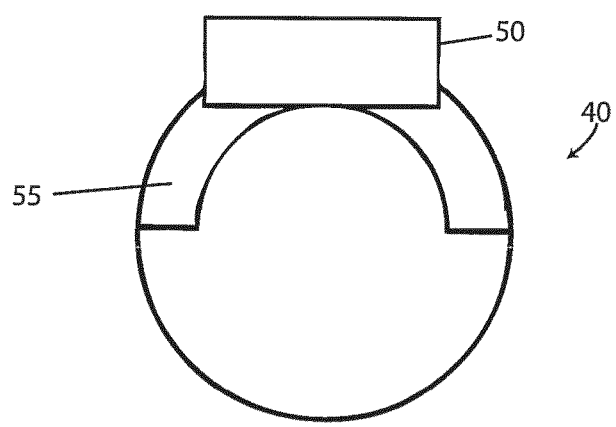
FIG. 2B illustrates a schematic top view of a rotational sensor for use in a system for detecting position of a movable object in a device and using the same for controlling the device in accordance with an embodiment of the present disclosure.

FIG. 2A and 2B illustrate schematic views of another embodiment of a rotational sensor 40 for use in the system 10 for detecting position of the movable object 23 in a device and using the same for controlling the device. FIG. 2A is a side view of the rotational sensor 40, and FIG. 2B is a top view of the rotational sensor 40. In an embodiment, the rotational sensor 40 may have an LED 45. The LED 45 may preferably be the light source 20 as shown in FIG. 1. The rotational sensor 40 may also have electronics 50 that may operate the LED 45 and/or may perform other control and/or measurement functions of the rotational sensor 40.

In the embodiment shown in FIGS. 2A and 2B, the rotational sensor 40 may have an oil filled cavity 55. A bottom 56 of the oil filled cavity 55 may have a sloped floor 57. When filled with light from the LED 45 and sensed by the light detector 22, rotation may be resolved from the change in light intensities resulting from the change of volume from the sloped floor 57 of the oil filled cavity 55 moving below the light detector 22.

In an embodiment, obtaining a signal for a rotational operation from the system 10 using the light source 20 and the light detector 22 may be accomplished in different manners. For example, the signal may be obtained by having a gradient as shown in FIGS. 3A, 3B and 3C that may be read by the sensor 30. The light source 20 and the light detector 22 may be placed side by side, across a width from each other and/or one may be centered and the other may be located elsewhere. The placement of the light source 20 and the light detector 22 may be selected based upon the signal and gain desired for the particular application. FIGS. 4A, 4B and 4C illustrate side views of profiles of positioning of the light source 20 and the light detector 22. As shown in FIG. 4A, the light source 20 and the light detector 22 may both be positioned off center. As shown in FIG. 4B, the light source 20 may be positioned on center, and the light detector 22 may be positioned off center. As shown in FIG. 4C, the light source 20 may be positioned off center, and the light detector 22 may be positioned on center.

The gradients read by the sensor 30 shown in FIGS. 3A, 3B and 3C may be located on a plate 60. The plate 60 may be flat; however, other shapes may be used. Patterns may be used to facilitate signal response. For example, in FIG. 6, instead of having a physical piece shaped like the spiral 66, a pattern may be applied to a shaft 63 which may rotate about an axis A. The pattern may wrap around the shaft 63. The pattern may be printed on tape and/or like material and/or wrapped around the shaft 63. Any material that affects light may be used. In an embodiment, a surface roughness and/or texture may be detected. Thus, as a bearing may start to fail, for example, the bearing may create a mark on the shaft 63. The light detector 22 may detect the change in the reflected light. Therefore, anything that affects light may be used.

The light from the light source 20 may shine on the gradient on the plate 60. The light detector 22 may measure the reflected light off the gradient on the plate 60. As the plate 60 may rotate, the signal from the gradient on the plate 60 may indicate degrees of rotation according to the reflected light measured by the light detector 22. The output signal may be analog. Due to the nature of the analog signal, the signal may have infinite resolution.

The gain and/or the shape of the signal curve may be controlled by the type of material used, the profile or shape, the texture, the color and/or the like that may be coupled with electronics. The electronics may also change the gain and the shape of the signal curve. Also, other combinations of distance and the plate 60 may create a certain signal.

Various shapes may be used. For example, a small aperture may be located in a bearing race. As the bearing wears over time, the ball may flatten. The flattening may cause the reflection of the light to change. The sensor 30 may detect the change in the reflected light. Also, a cable winding on a drum may flatten as the device ages. The sensor 30 may detect the change in the reflected light. Further, a pattern may be cut into a shaft by a laser, for example. If the pattern is altered, the sensor 30 may detect the change in the reflected light. In another example, instead of using a bar code or QR codes with digital lines or blocks, the lightness and/or brightness may be detected to identify the object. A QR code may be altered to have different intensities or colors of light to make the matrix wider.

Figure 5A:
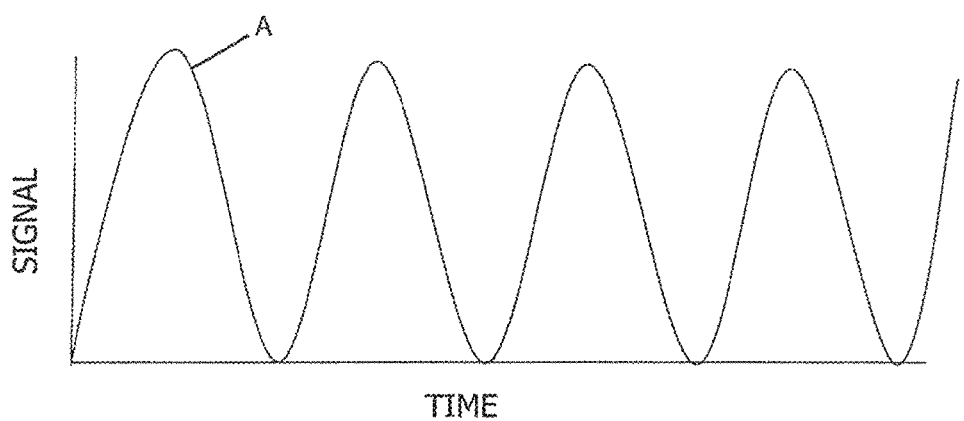
FIGS. 5A, 5B and 5C illustrate graphs of signal profiles in accordance with an embodiment of the present disclosure.
Figure 5B:
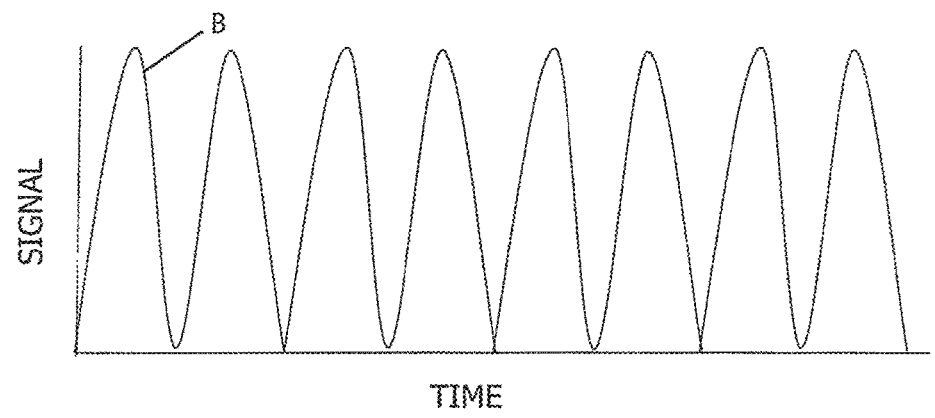
Figure 5C:
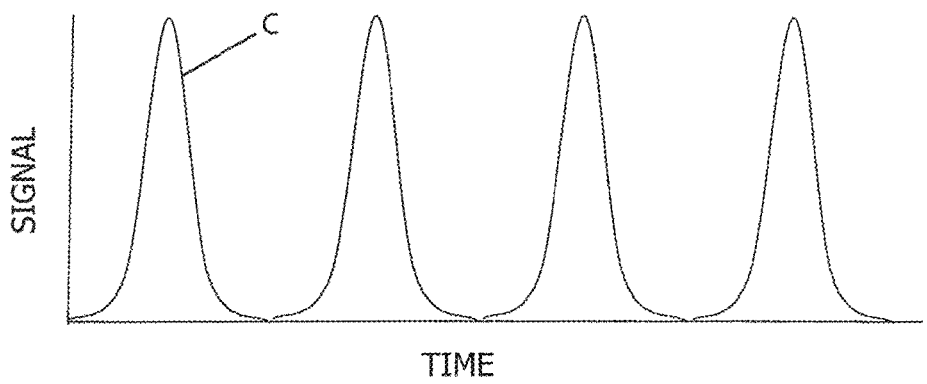

FIGS. 5A, 5B and 5C illustrate signals that may be derived from the corresponding gradients illustrated in FIGS. 3A, 3B and 3C. The signals illustrate magnitude of the signal on the y-axis and time on the x-axis. Thus, the signal of Profile A shown in FIG. 5A may correspond to the reflected light measured by the light detector 22 from the gradient shown in FIG. 3A. The signal of Profile B shown in FIG. 5B may correspond to the reflected light measured by the light detector 22 from the gradient shown in FIG. 3B. The signal of Profile C shown in FIG. 5C may correspond to the reflected light measured by the light detector 22 from the gradient shown in FIG. 3C.

In another embodiment, obtaining the signal for the rotational operation from the system 10 using the light source 20 and the light detector 22 may be accomplished by increasing the distance between the movable object 23 and the sensor 30, as shown in FIG. 1. The relative movement may have a nautilus shell type shape, a swirl and/or a spiral 66. The spiral 66 may be performed on any axis desired. Generally, the reflected output of light may be represented by a relationship in which the intensity of the light decreases with square of the distance from the detector in a $1/x^2$ curve. If desired, the shape of the movable object 23 may be changed to provide a native output that is linear. With any shape and/or printed gradient, the gain may be adjusted by altering the dynamic motion and/or physical shape of the movable object 23.

Figure 6:
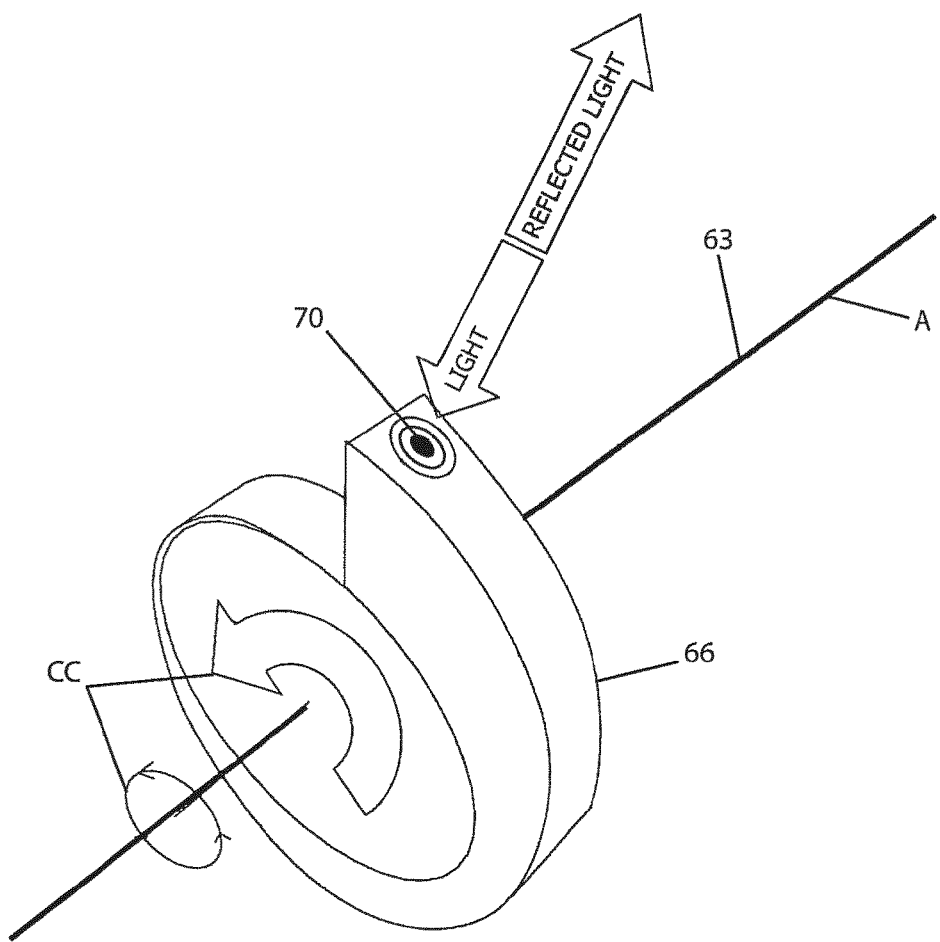
FIG. 6 illustrates a movable object in a position perpendicular to an axis of rotation of the movable object in accordance with an embodiment of the present disclosure.

FIG. 6 illustrates an embodiment of the present disclosure in which obtaining the signal for the rotational operation from the system 10 using the light source 20 and the light detector 22 may be accomplished in another manner. The signal for obtaining the rotational operation from the system 10 may be accomplished by increasing the distance between the movable object 23 and the sensor 30 as also shown in FIG. 1. FIG. 6 illustrates that an axis of rotation A of the movable object 23 may be counterclockwise as indicated by arrows CC. A target 70 may be represented and/or indicated by a circle shown in FIG. 6. However, the target 70 may not exist as a mark. The target 70 may be a place on which to focus the light and from which to receive the light. The light and the receivers do not move, but the spiral 66 may rotate. The system 10 may look at one spot at all times.

However, in an embodiment as described above, a physical mark may be made on the target 70 with a pencil, tape, a dent, a laser and/or the like to read the target 70 more efficiently and/or to change the signal output. For example, a digital signal may be used, and rotation may be read once every revolution. A mark may be made on the shaft 63, and the mark may be read every time the mark passes the same point in each revolution.

For example, the target 70 may not be painted on the movable object 23. The target 70 may be a reference point where the light from the light source 20 may be focused and reflected to the light detector 22. As shown in FIG. 6, the target 70 of the movable object 23 may be perpendicular to the axis of rotation of the movable object 23.

Figure 7:
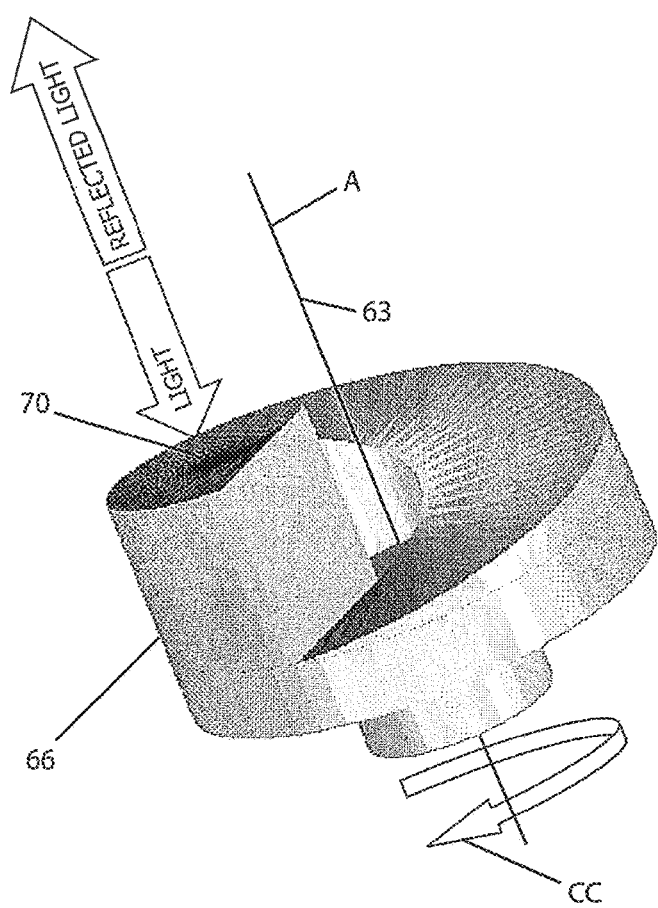
FIG. 7 illustrates a movable object in a position parallel to the axis of rotation of the movable object in accordance with an embodiment of the present disclosure.

FIG. 7 illustrates an embodiment of the present disclosure in which obtaining the signal for the rotational operation from the system 10 using the light source 20 and the light detector 22 may be accomplished by increasing the distance between the movable object 23 and the sensor 30. FIG. 7 illustrates that the axis of rotation A of the movable object 23 may be counterclockwise as shown by arrow CC. The target 70 may be represented and/or indicated by a circle shown in FIG. 7. However, the target 70 may not exist as a mark. For example, the target 70 may not be painted on the movable object 23. The target 70 may be a reference point where the light from the light source 20 may be focused and reflected to the light detector 22. As shown in FIG. 7, the target 70 of the movable object 23 may be parallel to the axis of rotation of the movable object 23.

Thus, the target 70 may be perpendicular to the axis of rotation of the movable object 23 as shown in FIG. 6, or the target 70 may be parallel to the axis of rotation of the movable object 23 as shown in FIG. 7. In FIG. 6, the spiral 66 may change along the vertical axis. In FIG. 7, the spiral 66 may change along the horizontal axis. In an embodiment, the light detector 22 may show changes in a moving shaft on two axes.

Figure 8:
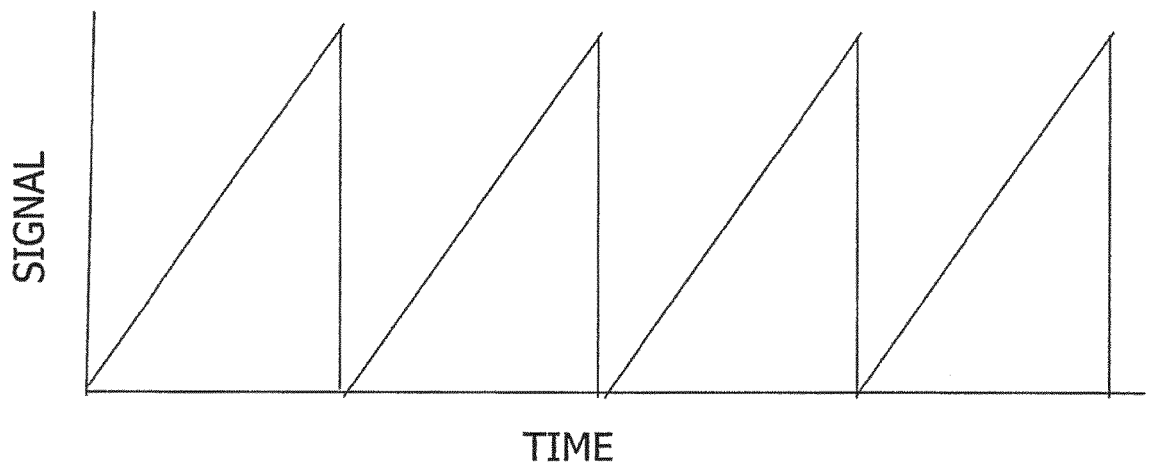
FIG. 8 illustrates a graph of a signal profile in accordance with an embodiment of the present disclosure.

FIG. 8 illustrates the profile of a signal generated by the sensor 30 for the system 10. The system 10 may obtain the signal for the rotational operation using the light source 20 and the light detector 22. FIG. 8 illustrates the magnitude of the signal on the y-axis and time on the x-axis. Thus, the signal shown in FIG. 8 may correspond to the reflected light measured by the light detector 22 from the target 70 shown in FIG. 6 and/or FIG. 7. The signal may be a voltage signal in an embodiment in which the light detector 22 may emit a voltage. The reflected output of light may be represented by a relationship in which the intensity of the light decreases with square of the distance from the light detector 22 in a $1/x^2$ curve. The gain and/or the shape of the signal curve may be controlled by the type of material used, the profile or shape, the texture, the color and/or the like coupled with electronics. The electronics may also change the gain and/or the shape of the signal curve.

Referring to the embodiment of FIG. 1, the apparatus, the system, and the method for detecting position of a movable object in a device and using the same for controlling the device may detect the position of the movable object 23 on the rotating crankshaft 25, which may be a crankshaft within an engine. The position of the movable object 23 may be determined by the system 10. The system 10 may also have one or more microprocessors and/or microcontrollers as disclosed in U.S. Pat. Nos. 7,388,188 B2, 8,436,287 B2, 8,115,185 B2, 7,935,916 B2 and 7,626,153 connected within the system 10.

The microprocessor(s) and/or microcontroller(s) may be used in conjunction with an engine control unit (not shown). The engine control unit may manage certain functions and/or operations of the engine. For example, the combustion cycle may be controlled by the engine control unit. The engine control unit may also control the speed of rotation of the crankshaft 25 and the timing of combustion cycles, for examples. As a result, the system 10 may be used to adjust the timing of the engine for optimizing performance and/or efficiency.

The movable object 23 may be connected to the crankshaft 25 to indicate when the piston may be located at top dead center, known as "TDC". For example, a line marked TDC in FIG. 1 may indicate the position of the crankshaft 25 with the piston located at TDC. As the crankshaft 25 may rotate within the engine, the movable object 23 may move relative to the sensor 30. The system 10 may determine the position of the movable object 23 at any time during rotation of the crankshaft 25. The system 10 may determine the position of the movable object 23 at TDC on each revolution of the crankshaft 25.

Further, the system 10 may utilize the sensor 30 to determine the position of the movable object 23 at any other point in the revolution of the crankshaft 25. The system 10 may determine the position of the movable object 23 within the time period of one revolution of the crankshaft 25. At any time during a revolution of the crankshaft 25, the system 10 may communicate the position of the movable object 23 to the engine control unit. The engine control unit may utilize the position information to adjust the timing of the engine. Further, the system 10 may be used in a dirty environment. The dirt may be centrifugally accelerated to the outermost perimeter which may keep a target area clean to enable the sensor 30 to read the position of the movable object 23.

Thus, the system 10 may provide location information of the movable object 23 to the engine control unit. The engine control unit may adjust the timing of the engine during a revolution without waiting until the movable object 23 may pass by TDC. For example, the system 10 may provide location information of the movable object 23 at any time during a revolution of the crankshaft 25 so that the engine control unit may advance and/or may retard the timing of the engine.

Accordingly, the system 10 may be used for detecting a position of a movable object in a device and using the same for controlling the device. Preferably, the apparatus, system and method of the present disclosure may be used for detecting position of the movable object 23 in the engine and using the same for controlling the engine. Thus, the system 10 may allow the engine control unit and/or a user to adjust the timing of the engine for optimizing performance and/or efficiency. However, the disclosure should not be limited to detecting the position of the movable object 23 on the crankshaft 25 of the engine. The system 10 may also be used to detect the position of any movable object 23, as desired. Of course, other uses may be possible using the disclosure and are considered to be within the scope of the disclosure.

In the disclosed embodiments, QVLAx technology developed by the applicant, including the LED and the sensor, can provide an analog signal from a profile shape on a rotating object. The technology can be utilized to do so either in the Z axis (see FIGS. 7 and 9), the X axis (see FIGS. 6 and 10), or any combination thereof. In engine embodiments, each of the profile shapes can be rotated by a mechanical engine component, such as an engine crankshaft.

Figure 9:
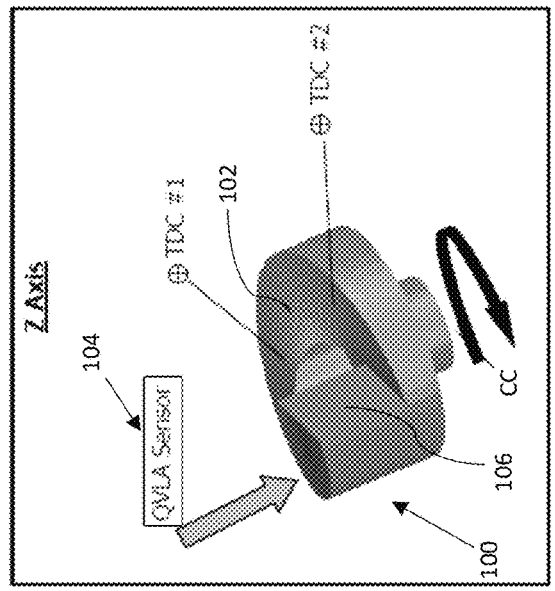
FIG. 9 illustrates an example of a movable object with a reflecting surface facing in an axial direction along a Z axis in a device according to an embodiment of the present disclosure.
Figure 10:
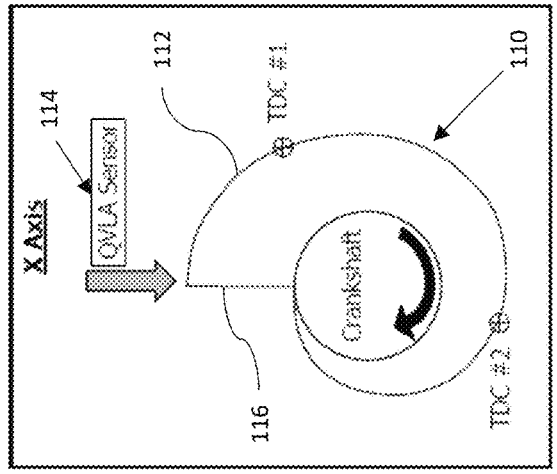
FIG. 10 illustrates an example of a movable object with a reflecting surface facing in a radial direction relative to an X axis in a device according to an embodiment of the present disclosure.
Figure 11:
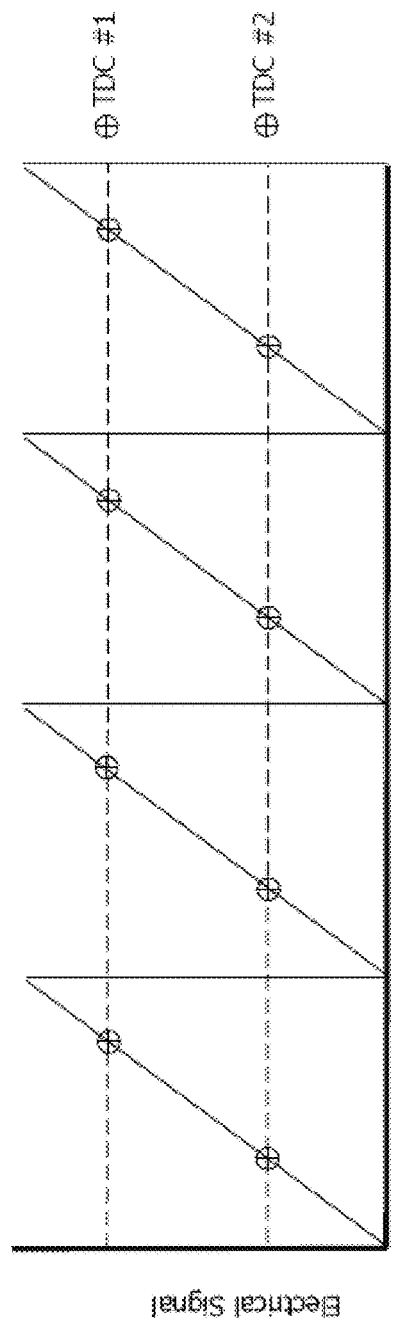
FIG. 11 illustrates a graph of a signal profile, which can be generated by an apparatus, system, and method according to an embodiment of the present disclosure.

FIG. 9 shows one example of an object 100, similar to FIG. 7, that can be carried on a rotating shaft, such as an engine crankshaft (not shown), for rotation about the shaft axis according to the arrow CC. In this example, a reflecting region or surface 102 on the object 100 faces in the Z-axis direction. FIG. 10 shows another example of an object 110, similar to FIG. 6, that can be carried on a rotating shaft, such as an engine crankshaft (not shown), for rotation about the shaft axis according to the arrow CC. In this example, a reflecting region or surface 112 on the object 110 faces in the X-axis direction. The electrical signal produced by a sensors 104 and 114 would be, based on the shape of the rotatable object, in the form of a saw tooth, such as is as shown in FIG. 11 for two cylinders. Each of the two cylinders has a different and specific TDC position, indicated in FIGS. 9 and 10 as TDC #1 and TDC #2 for the two cylinders, respectively. The upward slope in FIG. 11 depicts the rotation of the crankshaft from 0 to 360 degrees. The upward slope resolves the TDC of both pistons. The near vertical downward slope in FIG. 11 is associated with the sharp transition 106 or 116, respectively, on each reflecting region or profile surface 102 and 112, as depicted in FIGS. 9 and 10. The TDC #1 and TDC #2 positions of the two cylinders can be recorded and monitored relative to the slope of the curve in FIG. 11. As with other of the disclosed examples, other shaped rotatable objects can be utilized to produce other signal shapes, such as a sinusoidal shape, if desired. The shape can be varied to produce a desired signal shape that best suits a given application of the disclosed apparatus, system, and method.

The resolution for collected data and information is very fine. Following is some math associated with the high speed and accuracy that is realized by utilizing the QVLA® technology. Using the QVLA® technology can resolve a signal by 50,000 bits. This permits a large amount of data points per degree of rotation or travel of the crankshaft and, thus, the rotating object, such as the objects 100 or 110 of FIGS. 9 and 10, on the crankshaft that carries the reflecting region and surface. In other words, 50,000 bits/360 degrees of rotation=138.8 bits per degree of rotation. Also, this results in 1/138.8=0.0072 degrees resolution and/or 0.0072 degrees per bit. The QVLA® technology imparted in the sensors 104 and 114 can operate at about 35 kHz, which is equal to about 2,100,000 RPM. Thus, the disclosed timing solutions can more than keep up with high speed engine rotation and still provide extremely accurate data and information.

Figure 12:
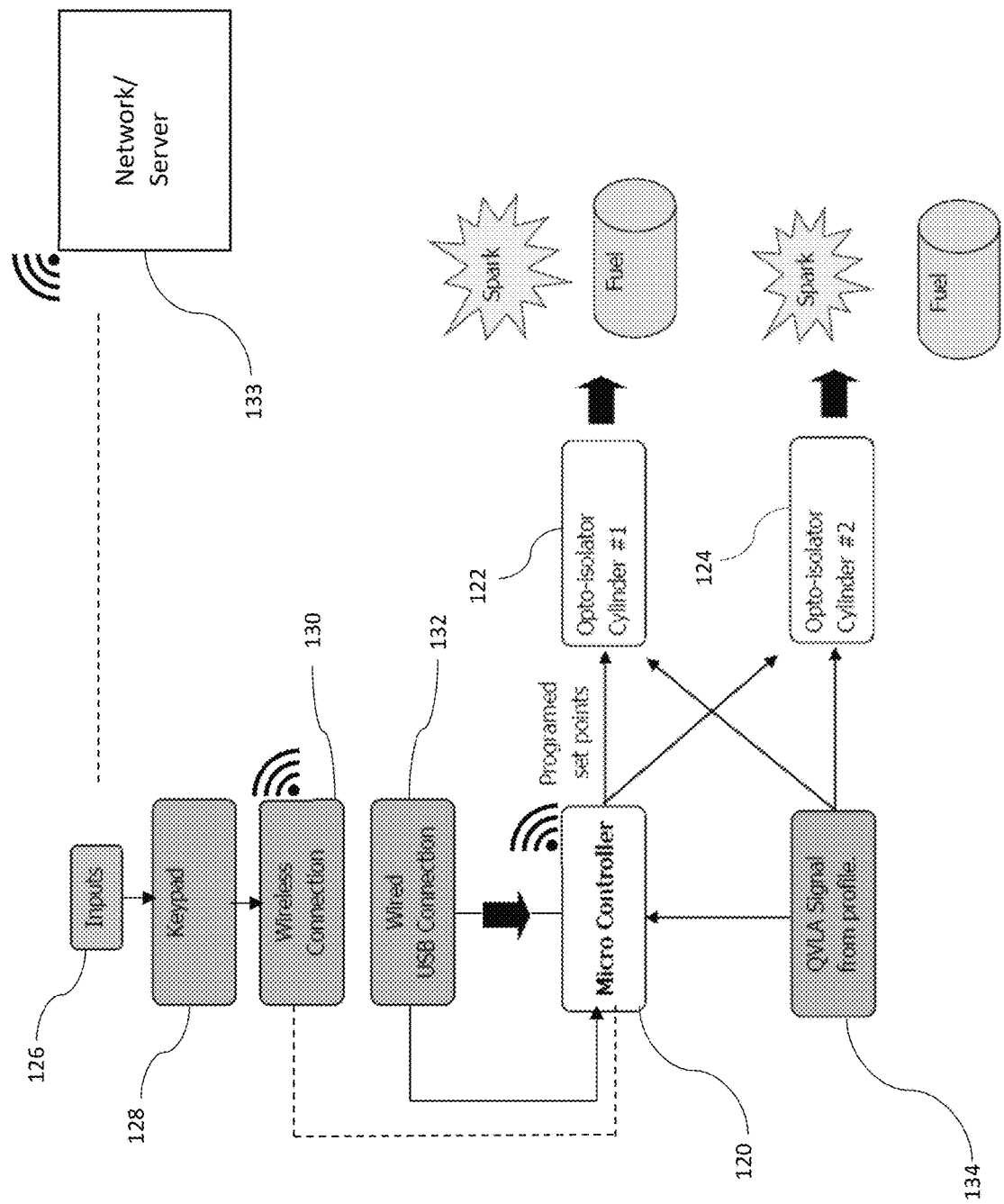
FIG. 12 illustrates a flow chart of a method for controlling an engine according to an embodiment of the present disclosure.

As shown in FIG. 12, an apparatus and system can incorporate the above described technology. The system can include input parameters, as indicated at 126, which may be input using a keypad 128 of an electronic device computing device. The device may be optionally connected to the system wirelessly (130) or by hardwire connection (132). The device may be a computer connected of a remote server or network 134, either by hardwire connection or wireless connection. Data collected by the system may be uploaded to and stored on the network or server 133. Software and calculation functions noted herein for the ECU or microcontroller of the system (see below) may instead be performed in part or entirely by the network or remote server 133.

In operation, referring to FIG. 12, the primary function of the microprocessor(s) or microcontroller(s) (hereinafter "the microcontroller 120") may be to communicate. The microcontroller 120 receives initial inputs at 126 from initial calibration and desired changes in the field from the operator. After receiving the initial inputs, the information may be programmed into opto-isolators 122, 124 for the two cylinders of a two-piston engine. The microcontroller 120 may be constantly monitoring the QVLA® signal 134, along with the opto-isolators 122, 124. The opto-isolators 122, 124 may continuously monitor the QVLA signal and compare the signal to the stored inputs from the microcontroller 120. When there is a match, the opto-isolators 122, 124 can then close the outputs. There need not be any programming loop to slow this function down.

Figure 13:
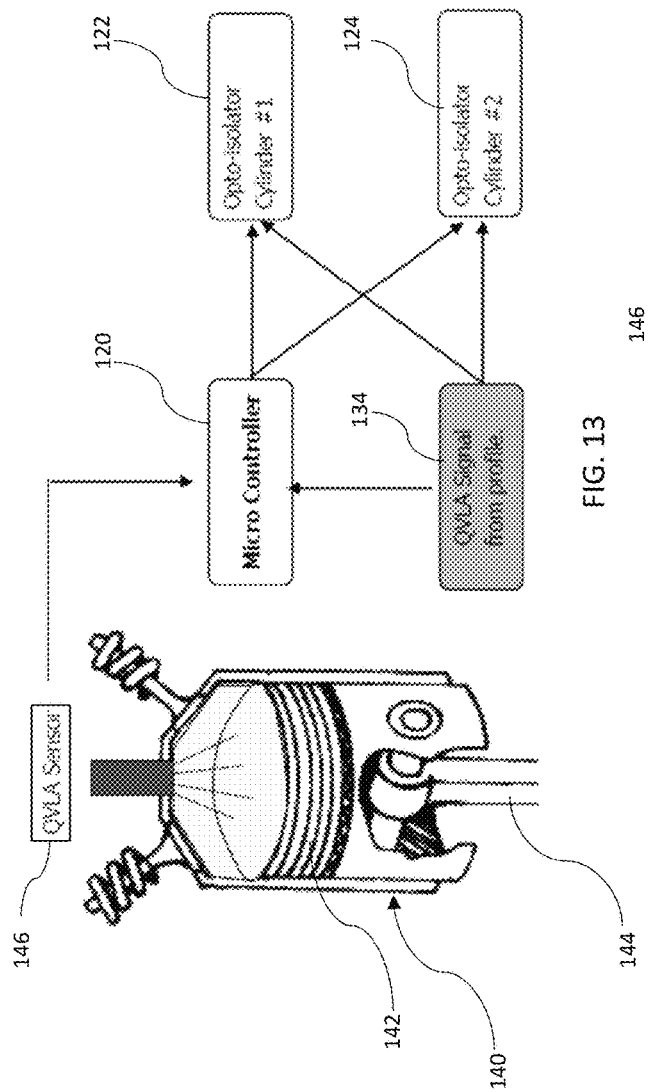
FIG. 13 illustrates a schematic flow chart of a method for controlling an engine according to an embodiment of the present disclosure.
Figure 14:
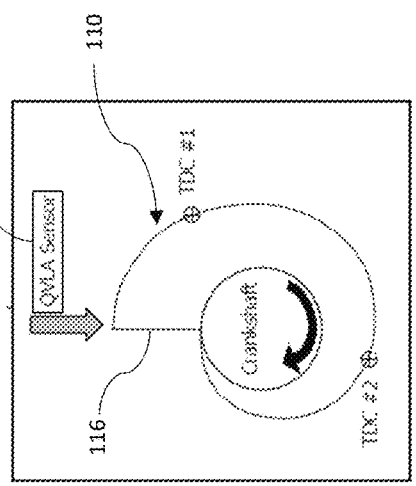
FIG. 14 illustrates a method of calibrating an engine according to an embodiment of the present disclosure.

FIG. 13 shows another depiction of the system associated with a cylinder 140 of an engine (not shown) and a piston 142 movably received in the cylinder. The piston 142 can be moved, as is known in the art, via rotation of a crankshaft (not shown) coupled to a crank arm 144 of the piston. The system may be calibrated, referring to FIG. 13, as all mechanical and electronic components have slight variations and tolerances, i.e., imperfections. There is a need for an easy and/or quick way to compensate for these imperfections in real world operation, such as in the realm of engines. Using QVLA® technology for initial calibration can provide this easier and/or quicker way to account for these imperfections in, i.e., calibrate such systems. Instead of using a rotational sensor, one can go back to using a linear sensor as used in a pneumatic cylinder. Each engine coming off an assembly line can be configured to include QVLA® sensors 146 attached to the spark plug opening. As the crankshaft, which includes a rotating object with a reflecting region or surface (such as the object 110 of FIG. 10), is slowly rotated (see FIG. 14), the microcontroller 120 can resolve the TDC (highest signal) from the QVLA® sensor in the spark plug opening of each cylinder. A part of the system, such as the microcontroller 120, can then match that signal to the QVLA® signal from the profile, and that number can be programmed into the opto-isolators 122, 124, etc. for each given cylinder.

The disclosed apparatus, system, and method can continuously and precisely monitor and account for any change in various performance parameters and characteristics in an engine. The disclosed apparatus, system, and method can also facilitate, such as via the microcontroller, near immediate and continuous adjustment in engine operation based on such changes to maintain optimal or peak performance. In one embodiment, the goal may be to provide an engine control unit (ECU) that is built for 1-cylinder and 2-cylinder engines and that includes the following capabilities:

Reduced cost—minimize the cost and expense to outfit an engine with the disclosed system and to install the system on an engine.

Smaller package—provide a system that is effective and yet small enough so that it is not intrusive to a specific engine environment for which it is designed.

More robust—provide a system that is durable and long lasting, and yet that is efficient and not cumbersome when installed.

Less EMI susceptibility—provide a system that is less susceptible to electromagnetic interference (EMI) during use.

Fewer sensors—provide a system that utilizes fewer engine sensors than known systems and yet that is no less effective, and preferably substantially more effective, during use.

Better fuel economy—provide a system that can improve engine fuel economy, such as up to 30%, and that can do so for fuel injected and non-fuel injected engines.

Fuel quality sensing—provide a system that can detect or sense the level of fuel quality being distributed to the engine cylinders, such as by diagnosing engine performance.

Friction sensing—provide a system that can detect or sense internal friction within the engine, and that may be capable of de-rating the engine if a lubrication level is low, or that may perform a full shut down of the engine if there is a lubrication failure, i.e., no lubrication present.

Tilt sensing—provide a system that may detect or sense the degree of tilt within an engine, and can alter engine function or operation, as needed.

In existing or current technologies, spark timing and fuel feed for an internal combustion engine is approximated using multiple sensor inputs. A fast, accurate, and affordable sensor and solution has not been previously developed or has not been available that can precisely track the stoichiometric reaction within individual cylinders of internal combustion engines. The result is that the multiple sensors are configured to attempt to bracket, i.e., estimate or measure the reaction within the cylinders.

It is known that engine torque is subject to change throughout the rotation of the crankshaft as a result of the stoichiometric equation for an internal combustion engine. These torque changes are outlined in various papers that are available to the public. To achieve the above goals, it can be helpful and important to know exactly where a crankshaft is in a rotation cycle, to know the stoichiometric equation of the engine, and to then apply fuel and ignition spark that is timed accurately for each cylinder of the engine.

According to the disclosure, a QVLA® sensor operating at, for example, 30 kHz can be configured to accurately follow crankshaft rotation and position. The disclosed system can provide precise crankshaft speed, acceleration, deceleration, and TDC information virtually instantaneously without the need for software. Managing spark timing and fuel feed from QVLA® sensor information and signal information will be more efficient, less complex, and reduce cost by resolving crankshaft position, speed, and acceleration within a 50th of a degree virtually instantaneously. There is no need to estimate crankshaft speed from multiple turns and to then adjust fuel from oxygen sensor data. The system can be configured so that spark and fuel will take place at a precise and optimal moment for each and every engine revolution. Each fuel burn can be accurately assessed through the position/speed/acceleration data acquired. Employing a single QVLA® sensor, coupled with knowledge of the stoichiometric cycle of the engine, can lead to elimination of sensors while improving performance. Increased performance can be expected from fuel injected and non-fuel injected engines. Adding a background algorithm or software to the system or application can realize additional benefits, including the capability to deduce internal friction, engine load, fuel quality, and the like, based on changes detected by the system.

Thus, as noted herein, basic timing for an engine or another rotating object can be accomplished without the use of a microprocessor, software, or a controller. However, applying a unique software program or algorithm to the disclosed system and apparatus can allow for numerous potential advantages and improvements during operation and use. For example, the engine controller, i.e., ECU, or a microprocessor within the system or apparatus can be programmed and implemented to control aspects of the engine's operation or the rotating object's function. Hereinbelow, the term "system" may refer to an apparatus or a system that incorporates an engine controller or a microprocessor somewhere in the system, where the controller or microprocessor is configured to monitor, store, and/or control aspects of an engine to improve engine timing and efficiency or a rotating object's timing and efficiency.

In one example, the system can be programmed or configured to diagnose the analog sine wave of engine or object rotation to parse into different sections of acceleration. Those sections of increased acceleration indicate the part of the engine or rotation cycle of a power stroke. Deceleration sections of the analog sine wave will show the cycles after a power stroke. This will be very apparent in a single cylinder engine. Adding more cylinders will reduce the section of a rotation cycle that is affected. In other words, when there are more cylinders, at least one of the cylinders will always be in or approaching a power stroke.

The system can be programmed or implemented to identify the amount or degree of acceleration for each power stroke and for each cylinder. The amount of acceleration can be used to appropriately adjust the timing for the cylinder to increase acceleration and/or improve or adjust the stoichiometry, which can increase the efficiency of the engine.

The system can be programmed or implemented to adjust the duration of spark in a given cylinder. The engine controller or microprocessor can also be programmed to determine at what point in time the spark will occur for that cylinder. Thus, the system can be configured to control elements of an engine spark system.

The system can be programmed or implemented to adjust the amount of fuel injected into a cylinder. The system can further be programmed or implemented to determine precisely when fuel should be injected into the cylinder. Thus, the system can be configured to control elements of a fuel injection system for the engine or rotating object. This potential feature may be more useful in engines that have "in cylinder" fuel injection. However, the system can also be helpful or useful in less sophisticated carbureted engines by determining when fuel should be delivered.

The system can be programmed or implemented to adjust the cycle of the engine or crankshaft for each cylinder. This can be done by adjusting fuel delivery amount, fuel delivery timing, spark timing, and spark duration. This, as well as the above-mentioned adjustments and parameters, can also be done on the fly and for each revolution of the engine or crankshaft. Performing this aspect of the system can provide customized spark and fuel profiles for each cylinder, optimized during each revolution or for a range of revolutions. Doing so will enhance efficiency of the engine or rotating object and thus can account for and make up for inherent machining and electronic tolerances in the system and the engine or rotating object.

The system can be configured to store data to create a historical database. The stored data can include timing for fuel delivery and spark, spark duration, and delivered fuel amounts for each cylinder. The stored data can also include historical acceleration and deceleration information, as well as any other derivation of the position data. The system can be configured to compare current data to historical data to determine various changes in engine and specific cylinder performance. Such data comparisons and changes in data over time may be useful in identifying or determining wear or defects in the engine or a specific cylinder, such as a leaky valve, valve seat wear, valve head wear, piston ring wear, crankshaft bearing or piston wear, and the like.

For example, a leaky or worn exhaust valve will produce data that is different from a sound exhaust valve. Likewise, a leaky or worn intake valve will produce data that is different from a sound intake valve. A leaky or worn exhaust valve may also produce data that is distinguishable from that produced by a leaky or worn intake valve, and vice versa. In another example, slop or play in the connecting parts between a given piston or cylinder and a crankshaft or camshaft will produce data that is distinguishable from data produced by a cylinder with less or no slop or play. The data comparison may be able to diagnose crankshaft misalignment or crankshaft bearing wear or failure. These are only some of the many possible examples where data comparison within the disclosed programmed system can be advantageous. Thus, the system may be configured to diagnose and distinguish various forms of engine wear, failure, or malfunction while also performing the above-described engine timing benefits. Also, the system may be programmed and configured to diagnose issues and predict failures before they happen, which can help to avoid a catastrophic engine failure, prior to service, to address the diagnosed issue. The system can also be used to detect an underperforming cylinder among multiple cylinders of an engine. Once detected, the system can be configured to diagnose what the problem is for that underperforming cylinder by parsing the data produced by that cylinder. The system can also be configured to automatically adjust the fuel and spark parameters on the fly for the underperforming cylinder to improve performance and efficiency until the cylinder is repaired.

The system can be configured to account for or effectively make up for any inconsistencies in the rotating element(s) of the engine, such as a crankshaft. In the disclosed timing system, a voltage is associated with each cylinder at any given rotational position or orientation, and that voltage varies according to the rotational position. The voltage changes as the shaft rotates and the voltage is not repeated during a revolution of the shaft. The surface profile of the reflecting region or target surface on the rotating object of the shaft that creates the varying voltage can have many different profiles. Linearity of the surface profile, and thus the voltage change, is not necessary, within reason. Some design variations for the rotating object, and thus the reflecting region and reflecting surface, may allow for the voltage to be repeated. However, it could be differentiated by comparison to surrounding data. If the rotating object were to create a sin wave, for example, a specific data point could be singled out by looking at the slope of the graph and whether it was decreasing or increasing. If there is "noise" on, or generated by, the surface profile, that noise can negatively affect the signal generated, which can affect the accuracy of the determined position for a cylinder within a cycle of the engine. For example, blemishes on the reflecting region or target surface on which the light is directed, such as tooling marks, cuts, grooves, scratches, and the like, may create noise in the signal. The signal noise can thus affect the precision of the detected position for a cylinder or the shaft.

The system can be configured to account for changes in signal strength due to speed changes in the rotating shaft, such as a crankshaft. As the rotational speed of the shaft increases, the signal strength produced by the photo detector may be reduced. This reduction in signal strength is caused by the limited capability or functional limit of the photo detector to provide a signal fast enough. However, the signal will change proportional to the rotational speed of the shaft. The signal change will always be uniform and predictable. If the shaft reaches a certain high-speed threshold, the system program can be configured to account for the magnitude of the signal change and can then proportionally move or change the signal. This function can be done whether the system or components are completely digital, completely analog, or a combination of analog and digital.

The system can be configured for electric motors. Electric motors could be monitored in the same way as gas motors or combustion engines to measure the data, monitor performance, and/or determine which electromagnets to energize and when. Incorporating the system as part of an electric motor could have the potential to improve efficiency as well as power output. The data from the system could also be used to manipulate how much power is put into which coil at a certain moment. For example, the motor could start off with a lot of power and then the power could decrease as the magnet becomes closer, causing more force due to the electric field. This would enable a motor to maintain a more stable speed. Virtually all electric motors operate by providing a coil wherein a shaft responds to the coil. There are few electric motors that can measure the rotation or position of the shaft because the shaft rotates so fast and the sensor required to measure it is so expensive. Essentially this makes electric motors simple reactive mechanisms.

However, there is a need for electric motors to have feedback and provide positional information for control. In one example, the energizing of the windings may be timed or measured in a motor in time with the shaft to reverse the electrical flow in the windings to increase motor output with the same amounts of coils. Such a process would require precise timing. However, where utilized, the motors would be lighter and more powerful. Again, virtually all DC and AC motor shafts are passive and only react to the windings. The system can be configured to have an additional cam to help transition for electric motors.

The system can also be configured to compensate for temperature variations or changes. The system can sense or detect the temperature, or the effect of the temperature on the device, and then adjust or offset the signal accordingly to compensate, as is known in the art. The system can also be configured to focus the emitted light in a direction toward the reflecting region on the rotating object, to focus the reflected light in a direction toward the photo detector, or both. In one example, one or more lens can be positioned to accomplish the desired directional focusing of the light.

Figure 15:
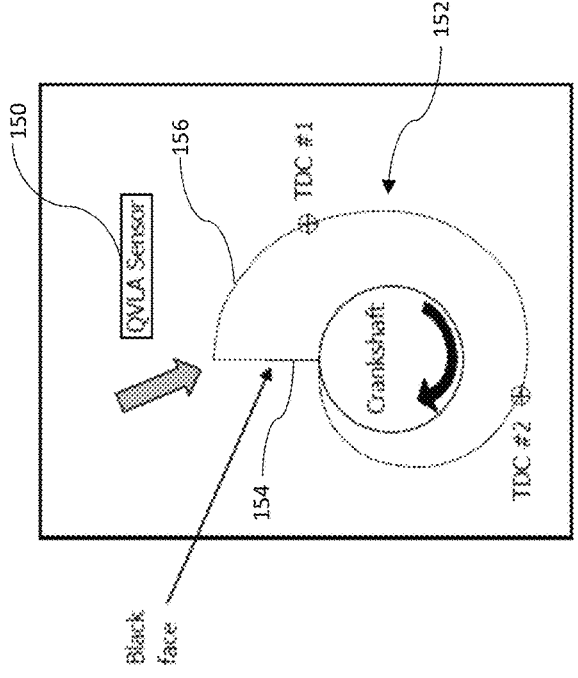
FIGS. 15 and 16 illustrate an example of a movable object with a reflecting surface facing in a radial direction relative to an X axis in a device with a sensor directed in different directions according to embodiments of the present disclosure.
Figure 16:
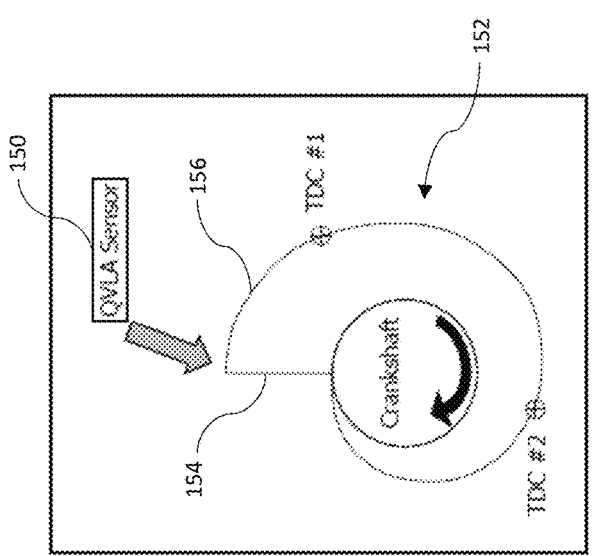

In a system, the strength and accuracy of the signal can be affected by the positioning of the photodetector, i.e., the QVLA® sensor. Referring to FIGS. 15 and 16, the sensor 150 should be precisely positioned when implemented relative to a rotating object 152 in an engine. The transition point 154 from high to low relative to the position of the reflecting region on the reflecting surface 156 of the rotating object 152 relative to the sensor 150 is important, unless another surface profile is utilized that does not produce such a transition point. The way the sensor 150 is implemented may hurt or enhance the signals generated by the sensor. If the transition point 154 on the reflecting surface 156 is sharp with a hard cutoff, the angle of attack, i.e., the angle of incidence of the sensor 150 relative to the sharp transition, may be important, and is indicated by the arrows in FIGS. 15 and 16. The arrows in these examples represent both the light source or emitter, i.e., an LED, and the sensor or detector, i.e., the QVLA® sensor in one position. In other examples, the sensor 150 or both the emitter and detector could be a fiber optic device and/or could be two separate devices.

Figure 17A:
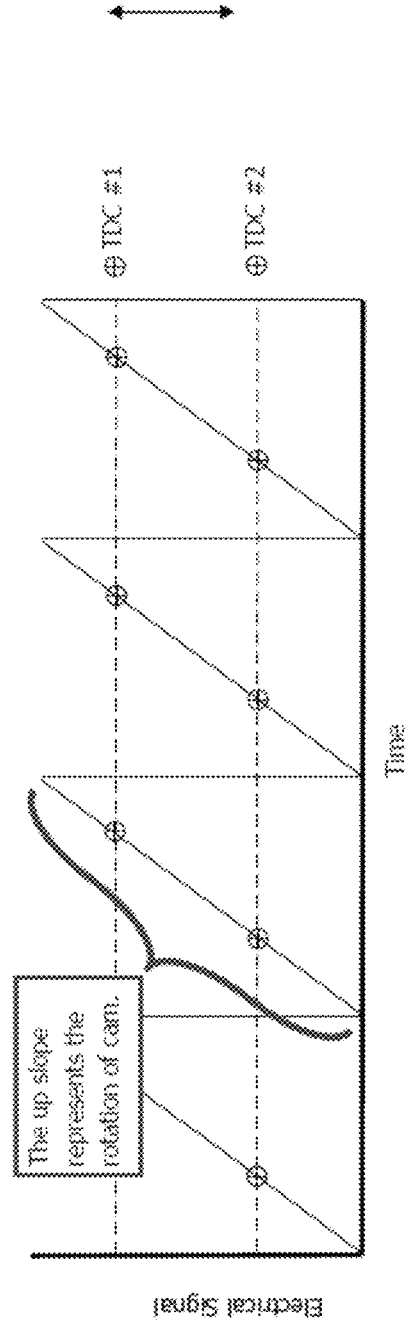
FIGS. 17A, 17B, and 17C illustrate annotated graphs of a signal profile generated by an apparatus, system, and method according to an embodiment of the present disclosure.
Figure 17B:
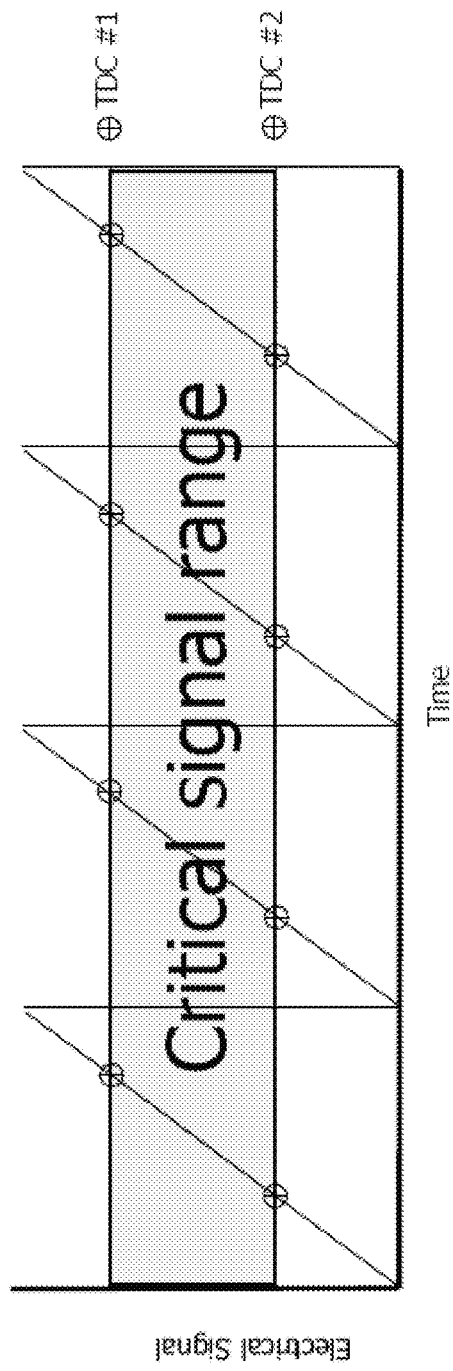
Figure 17C:
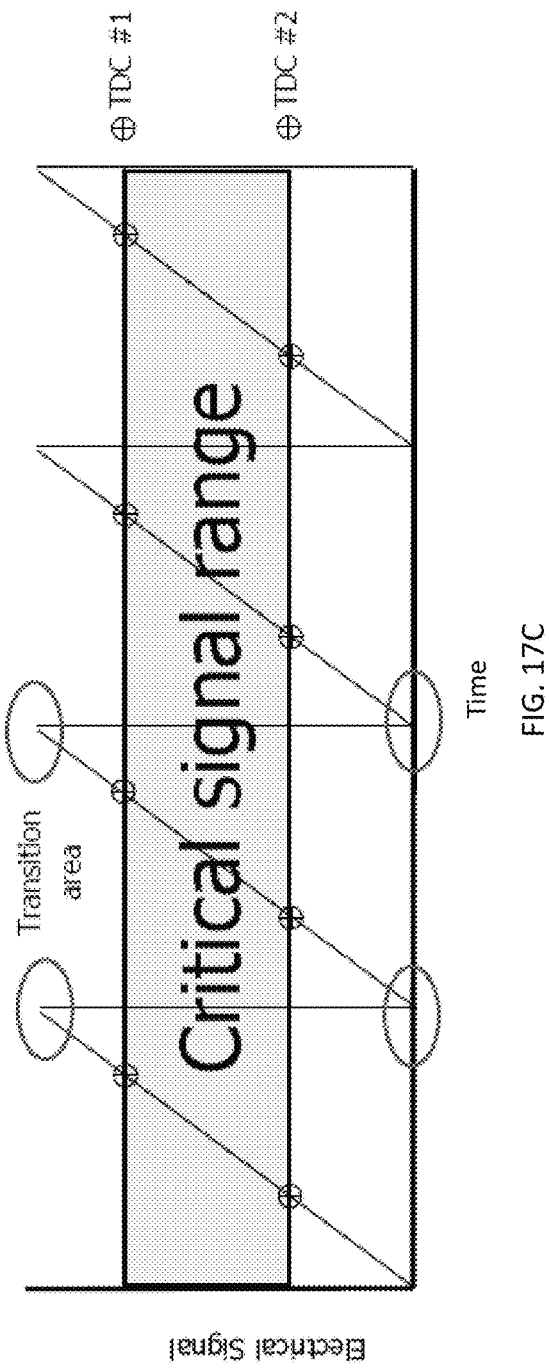
Figure 18A:
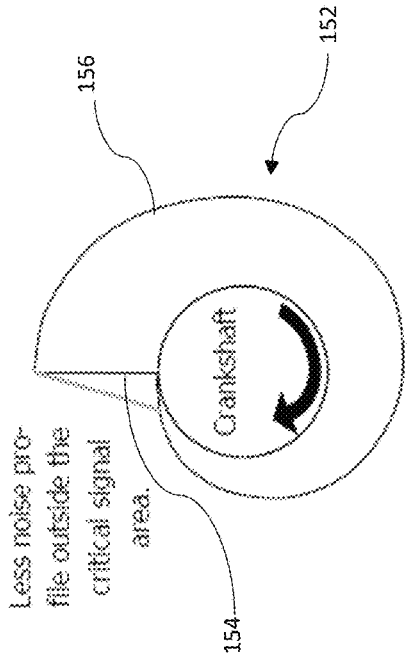
FIGS. 18A and 18B illustrate annotated examples of a movable object with a reflecting surface facing in a radial direction relative to an X axis in a device and according to embodiments of the present disclosure.
Figure 18B:
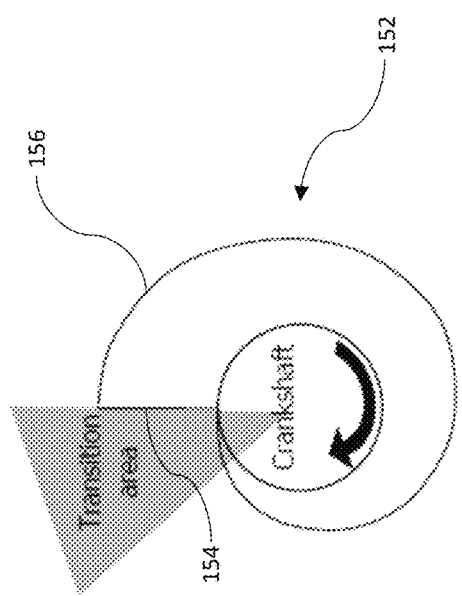

Referring to FIGS. 17A, 17B, and 17C, the graphs represent the signal profile for the arrangements depicted in FIG. 15 or 16. The critical range in the slope for use according to the disclosure is shown in the images between top dead center (TDC), i.e., TDC #1 and TDC #2. The signal range nearer the transition point, if there is a transition point, on the rotating object and the reflecting surface is less critical. If there is slop at the top and bottom of the signal range, the slop will not have a significant effect on the results, unless the slop is within the critical signal range. In one alternative, with a fast software program or algorithm, the algorithm can identify or detect where a signal is on the slope of the curve. The software can be configured to ignore any slop or noise on the top and bottom of the signal range nearer the transition area. See FIGS. 18A and 18B, which depict the region where noise or slop in the signal may occur, wherein the region is nearer the transition area of the reflecting surface and region.

Figure 20:
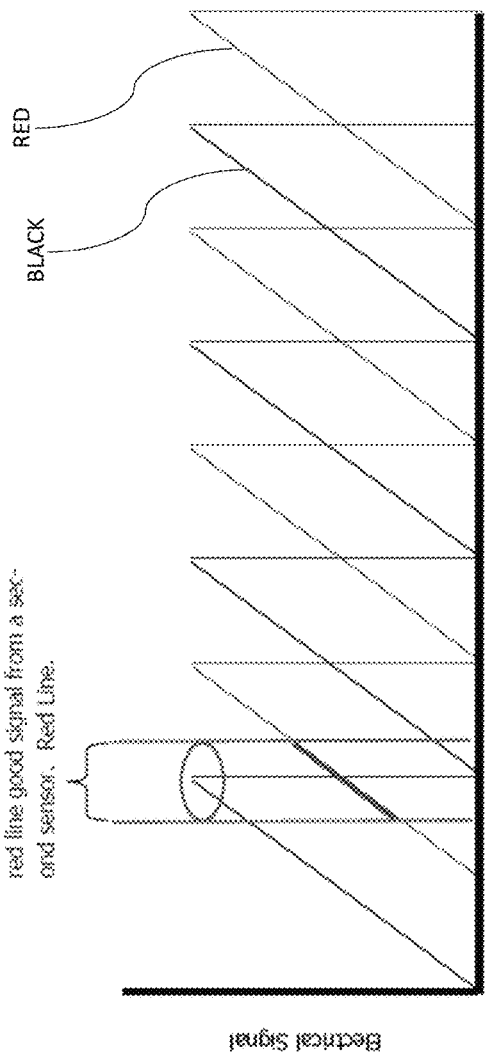
FIG. 20 illustrates an annotated graph of a signal profile generated by an apparatus, system, and method according to an embodiment of the present disclosure utilizing two sensors as in FIGS. 19A, 19B, and 19C.
Figures 19A, 19B, 19C:
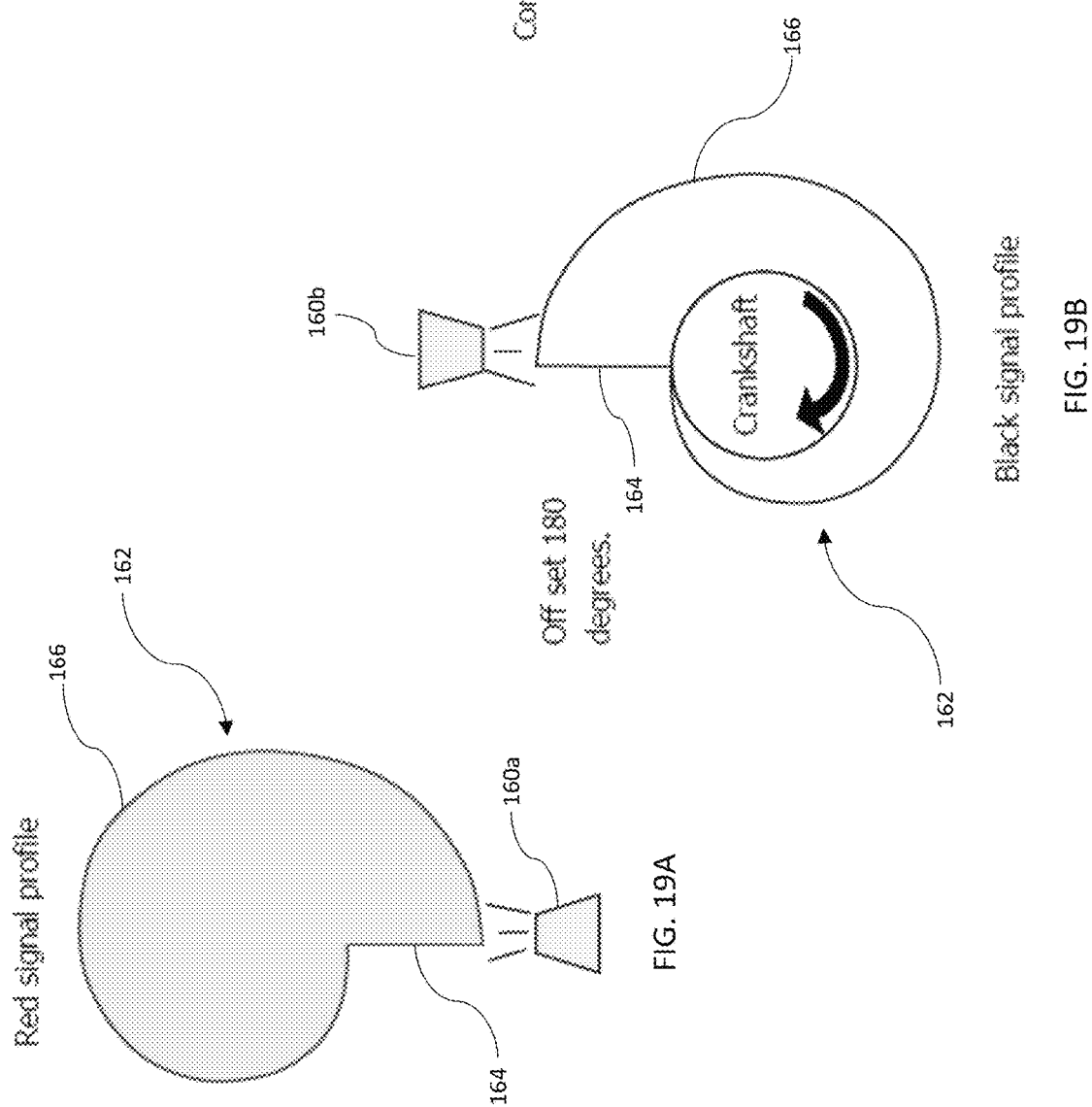
FIGS. 19A, 19B, and 19C illustrate an annotated example of a movable object with a reflecting surface facing in a radial direction relative to an X axis in a device according to an embodiment of the present disclosure and utilizing two sensors.

Referring to FIGS. 19A-19C, the system can be configured using two sensors 160a, 160b directed at the same rotating object 162. FIG. 19A shows a first sensor 160a positioned at a bottom of the rotating object 162 with the rotating object rotated to a position with the transition area 164 adjacent the first sensor. FIG. 19B shows a second sensor 160b positioned 180 degrees offset or out of phase to the first sensor 160a and shows the rotating object 162 rotated to a position with the transition area 164 adjacent the second sensor. FIG. 19C shows both sensors 160, 160b and the rotating object 162 in the two positions, superimposed over one another. If there are two sensors 160a, 160b deployed on a single shaft, the transition area 164 of the reflecting surface 166 could be ignored by combining the two signals. See FIG. 20. Use of the two sensors could be done to increase the critical signal relative to the entire signal profile.

In other examples, other aspects of an entire vehicle or overall device may be monitored, diagnosed, and the like. The motor is only one part of a vehicle or device that has a motor. For example, with proper diagnosis, and some experience, a motor reacting to a dragging brake could be diagnosed with QVLA®, which can lead to a warning being sent. In such an example, this view takes into account a larger whole view of the motor as part of the entire vehicle or device. The diagnosis that would be available to QVLA® and it's historical data has many possibilities. Predictable failures and maintenance of other aspects of the overall vehicle or device may be diagnosed using the disclosed systems and methods.

The apparatus, system, and method described herein can be configured using, or to be compatible with, various existing or to-be-developed electronic and computer technologies. A processor or microprocessor of the ECU, the microcontroller, the server or network computer, the device, and/or the like, i.e., a central processing unit (CPU) can include a set of instructions that can be executed to cause the CPU to perform any one or more of the methods or computer-based functions disclosed and described herein. The CPU may operate as a standalone device or may be connected, e.g., using a network, to other computer systems or peripheral devices, either within the system or remote from the system components. Any of the components discussed herein, such as the ECU, microcontroller, or CPU, may be or emulate a computer system. The CPU may be specifically configured to implement various operations and functions for the apparatus, system, and method, and the various remote external components and devices of the system.

In a networked deployment, the CPU may operate in the capacity of a server or as a client user computer in a client-server user network environment, or as a peer computer system in a peer-to-peer (or distributed) network environment with one or more processors of the various components and devices of the black box system. Other of the components and devices of the apparatus, system, and the method may include a separate processor, if desired. In one example, the CPU can be implemented with electronic devices that provide voice, video, or data communication. Further, while a single CPU is illustrated and described, the term "system" shall also be taken to include any collection of systems, sub-systems, or linked components and devices that individually or jointly execute a set, or multiple sets, of instructions to perform one or more computer functions.

The CPU may be or include one or more general processors, digital signal processors, specifically configured processors, application specific integrated circuits, field programmable gate arrays, servers, networks, digital circuits, analog circuits, combinations thereof, or other now known or later developed devices for analyzing and processing data. The CPU and other system processors may each implement a software program, such as code generated manually (i.e., programmed).

The CPU may include a memory that can communicate via a bus. The memory may be a main memory, a static memory, or a dynamic memory. The memory may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, and the like. In one example, the memory can include a cache or random-access memory for the CPU. In alternative examples, the memory can be separate from the CPU, such as a cache memory of a processor, the system memory, or other memory. The memory may be an external storage device or database for storing data. Examples include a hard drive, compact disc ("CD"), digital video disc ("DVD"), memory card, memory stick, floppy disc, universal serial bus ("USB") memory device, or any other device operative to store data. The memory is operable to store instructions executable by the CPU. The functions, acts or tasks described herein may be performed by the programmed CPU executing the instructions stored in the memory. The functions, acts or tasks are independent of the particular type of instruction set, storage media, processor or processing strategy, and may be performed by software, hardware, integrated circuits, firm-ware, micro-code, and the like, operating alone or in combination. Likewise, processing strategies may include multiprocessing, multitasking, parallel processing, and the like.

Additionally, the CPU may include an input device, such as the keypad 128, configured to allow a user to interact with any of the components of the CPU or the apparatus and system. The input device may be a number pad, a keyboard, or a cursor control device, such as a mouse, or a joystick, touch screen display, wired or wireless remote control, or any other device operative to interact with the CPU.

The CPU may also include a disk or optical drive unit. The disk drive unit may include a computer-readable medium in which one or more sets of instructions, e.g., software, can be embedded. Further, the instructions may embody one or more of the methods, operations, functions, or logic as described herein. In one example, the instructions may reside completely, or at least partially, within the memory and/or within the processor during execution by the CPU. The memory and the processor also may include computer-readable media as discussed herein.

The present disclosure contemplates a computer-readable medium that includes instructions or receives and executes instructions responsive to a propagated signal, so that one or more components and devices connected to the system network can communicate voice, video, audio, images, or any other data over the system network. Further, the instructions may be transmitted or received over the network via a communication interface. The communication interface may be a part of the processor or CPU or may be a separate component. The communication interface may be created in software or may be a physical connection in hardware. The communication interface may be configured to connect with other remote external components and devices of the apparatus and/or system, and/or with other internal components of the apparatus, system, or combinations thereof. The connection with the internal components may be a physical connection, such as a wired Ethernet connection or may be established wirelessly. Likewise, the additional connections with other external components and devices of the system may be physical connections or may be established wirelessly.

The network, if any, of the apparatus and system may include wired networks, wireless networks, or combinations thereof. The wireless network may be a cellular telephone network, an 802.11, 802.16, 802.20, or WiMax network. Further, the network, if any, of the apparatus and system may be a private network, such as an intranet, and may utilize a variety of networking protocols now available or later developed including, but not limited to, TCP/IP based networking protocols. Wireless signals may be RF signals and may be transmitted via antenna and transceivers within the system or may be transmitted via satellite.

Examples of the subject matter and the functional operations described in this specification can be implemented in digital electronic circuitry, or in computer software, firmware, or hardware, including the structures disclosed in this specification and their structural equivalents, or in combinations of one or more of them. Examples of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a non-limiting example, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative example, dedicated or otherwise specifically configured hardware implementations, such as application specific integrated circuits, programmable logic arrays and other hardware devices, can be constructed to implement one or more of the systems and methods described herein. Applications that may include the apparatus and systems of various embodiments can broadly include a variety of electronic and computer systems. One or more examples described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular examples with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random-access memory or both. The essential elements of a CPU may be a processor for performing instructions and one or more memory devices for storing instructions and data. Generally, The CPU may also include, or be operatively coupled to receive data from or transfer data to, or both, one or more mass storage devices for storing data, e.g., magnetic, magneto optical disks, or optical disks. However, the CPU need not have such devices. Moreover, the CPU can be embedded in another device or component of the apparatus or system. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with an authorized user, examples of the subject matter described in this specification can be downloaded or uploaded to another remote computer or electronic device from the apparatus and/or system. Such a remote device can then utilize a display, e.g., a CRT (cathode ray tube) or LCD (liquid crystal display) monitor, for displaying information to the user and a keyboard and a pointing device, e.g., a mouse or a trackball, by which the user can provide input to the remote computer or electronic device. Other kinds of remote devices can be used to provide for interaction with a user as well. Feedback provided to the user from the remote electronic device or computer can be any form of sensory feedback, e.g., visual feedback, auditory feedback, or tactile feedback. Input from the user to the remote electronic device or computer can be received in any form, including acoustic, speech, or tactile input.

The present disclosure is not limited to the specific arrangement of the components illustrated in the figures. It should be understood that various changes and modifications to the presently preferred embodiments described herein will be apparent to those having ordinary skill in the art. Such changes and modifications may be made without departing from the spirit and scope of the present disclosure and without diminishing its attendant advantages. It is, therefore, intended that such changes and modifications be covered by the appended claims.

What is claimed is:

1. A system for determining a position of a rotating object in a device and controlling the device according to a determined position or any derivation of the determined position, the system comprising:
    a reflecting region on the rotating object;
    a light source located in, on, or as a part of the device, wherein emitted light is emitted by the light source onto the reflecting region and reflected light is reflected off the rotating object, the reflected light having an intensity;
    a detector that detects the reflected light and measures the intensity of the reflected light; and
    a microcontroller configured to control the device according to the determined position,
    wherein the reflecting region has a feature configured to effect a change in the intensity of the reflected light as the rotating object rotates,
    wherein the change in the intensity of the reflected light corresponds to a change in a signal associated with a determined position of the rotating object,
    wherein the detector is configured to operate at a frequency of at least 25 kHz to accurately follow the position of the rotating object, such that the determined position of the rotating object is determined virtually instantaneously as the rotating object rotates, and
    wherein the microcontroller is configured to determine the determined position and to utilize the determined position and the change in the signal to control operating characteristics of the device, wherein the change in the signal is based on a shape of the rotating object.

2. The system of claim 1, wherein the rotating object comprises at least one portion of a shaft.

3. The system of claim 1, wherein the rotating object is positioned adjacent to the light source.

4. The system of claim 1, wherein the light source is a light emitting diode and the detector is a light detector.

5. The system of claim 1, wherein the feature of the reflecting region from which the reflected light is reflected varies according to the position of the rotating object with respect to the light source during the rotation of the shaft.

6. The system of claim 5, wherein the signal varies according to the feature of the reflecting region from which the reflected light is reflected that is adjacent the light source.

7. The system of claim 1, wherein the feature is a color gradient, an image pattern, a material, or a texture of the reflecting region on the rotating object, and wherein the feature varies over a surface area of the reflecting region.

8. The system of claim 1, wherein the feature of the reflecting region is a spiral surface around the rotating object,
wherein the signal is generated by determining a distance between a location on the spiral surface and the light source as the rotating object rotates,
wherein the distance varies according to the portion of the spiral surface adjacent to the light source, and
wherein the change in the intensity of the detected light corresponds to a change in the signal.

9. The system of claim 8, wherein the distance between the spiral surface and the light source varies in a radial direction from an axis of the rotating object.

10. The system of claim 8, wherein the distance between the spiral surface and the light source varies in an axial direction relative to an axis of the rotating object.

11. The system of claim 1, wherein the device is an engine, wherein the engine includes an engine control unit (ECU), wherein the microcontroller is a part of the ECU or is separate from but coupled to the ECU, and wherein the ECU is coupled to the detector and configured to determine the determined position of the rotating object in, on, or as a part of the engine according to the signal.

12. The system of claim 11, wherein the ECU is configured to adjust a timing of the engine according to the determined position of the rotating object.

13. The system of claim 12, wherein the ECU is configured to adjust the timing of the engine at any position of the rotating object within one revolution.

14. The system of claim 1, wherein the operating characteristics of the engine comprise any one or more of the following:
adjusting the fuel amount delivered to a cylinder of the engine;
adjusting the fuel amount delivered to the cylinder of the engine at each revolution of the engine;
adjusting the fuel delivery timing to a cylinder of the engine;
adjusting the fuel delivery timing to the cylinder of the engine at each revolution of the engine;
adjusting the spark ignition timing to a cylinder of the engine;
adjusting the spark ignition timing to the cylinder of the engine at each revolution of the engine;
adjusting the spark ignition duration to a cylinder of the engine;
adjusting the spark ignition duration to the cylinder of the engine at each revolution of the engine;
determining a top dead center (TDC) position of a cylinder of the engine;
determining the TDC position of the cylinder of the engine at each revolution of the engine;
determining a fuel quality within a cylinder of the engine;
determining the fuel quality within the cylinder of the engine at each revolution of the engine;
determining a power stroke for a cylinder of the engine;
determining the power stroke for the cylinder of the engine at each revolution of the engine;
adjusting the fuel/air mixture or stoichiometry for a cylinder of the engine;
adjusting the fuel/air mixture or stoichiometry for the cylinder of the engine at each revolution of the engine;
storing historical engine and cylinder data and, utilizing such stored data for diagnosing wear of one or more engine components, identifying a leaky valve, distinguishing between a leaky intake or exhaust valve, predicting failure of one or more engine components, diagnosing crankshaft misalignment, diagnosing crankshaft and/or camshaft bearing wear or failure, and/or determining whether one cylinder is producing more or less power compared to another cylinder of the engine; and/or
monitoring and/or diagnosing other functional aspects of an entire vehicle or device, aside from an engine or motor, such as diagnosing a dragging brake as a reaction of the motor and sending a warning regarding same.

15. A timing apparatus for determining a position of a rotating shaft in an engine, the timing apparatus comprising:
a reflecting region on a portion of the rotating shaft;
a light source located in, on, or as a part of the engine, wherein emitted light is emitted by the light source onto the reflecting region and reflected light is reflected off the rotating shaft, the reflected light having an intensity;
a detector that detects the reflected light and measures the intensity of the reflected light;
a microcontroller coupled to the detector and configured to determine the position of the rotating shaft in the engine according to a change in the intensity of the detected light and to control the engine,
wherein the reflecting region has a feature configured to effect the change in the intensity of the reflected light as the rotating shaft rotates,
wherein the change in the intensity of the reflected light corresponds to a change in a signal associated with a determined position of the rotating shaft,
wherein the detector is configured to operate at a frequency of at least 25 kHz to accurately follow the position of the rotating shaft, such that the determined position of the rotating shaft is determined virtually instantaneously as the rotating shaft rotates, and
wherein the microcontroller is configured to determine the determined position and to utilize the determined position and the change in the signal to control operating characteristics of the engine, wherein the change in the signal is based on a shape of the rotating object.

16. The timing apparatus of claim 15, wherein the operating characteristics of the engine comprise any one or more of the following:
adjusting the fuel amount delivered to a cylinder of the engine;
adjusting the fuel amount delivered to the cylinder of the engine at each revolution of the engine;
adjusting the fuel delivery timing to a cylinder of the engine;
adjusting the fuel delivery timing to the cylinder of the engine at each revolution of the engine;
adjusting the spark ignition timing to a cylinder of the engine;
adjusting the spark ignition timing to the cylinder of the engine at each revolution of the engine;
adjusting the spark ignition duration to a cylinder of the engine;
adjusting the spark ignition duration to the cylinder of the engine at each revolution of the engine;
determining a top dead center (TDC) position of a cylinder of the engine;

determining the TDC position of the cylinder of the engine at each revolution of the engine;

determining a fuel quality within a cylinder of the engine;

determining the fuel quality within the cylinder of the engine at each revolution of the engine;

determining a power stroke for a cylinder of the engine;

determining the power stroke for the cylinder of the engine at each revolution of the engine;

adjusting the fuel/air mixture or stoichiometry for a cylinder of the engine;

adjusting the fuel/air mixture or stoichiometry for the cylinder of the engine at each revolution of the engine;

storing historical engine and cylinder data and, utilizing such stored data for diagnosing wear of one or more engine components, identifying a leaky valve, distinguishing between a leaky intake or exhaust valve, predicting failure of one or more engine components, diagnosing crankshaft misalignment, diagnosing crankshaft and/or camshaft bearing wear or failure, and/or determining whether one cylinder is producing more or less power compared to another cylinder of the engine; and/or monitoring and/or diagnosing other functional aspects of an entire vehicle or device, aside from an engine or motor, such as diagnosing a dragging brake as a reaction of the motor and sending a warning regarding same.

17. A method for determining a position of a rotating object in an engine and controlling the engine according to the determined position of the rotating object, the method comprising the steps of:

emitting light from a light source onto a reflecting region on a portion of the rotating object;

reflecting light off the reflecting region of the rotating object;

detecting, by a detector, the reflected light off the reflecting region as the rotating object rotates;

measuring an intensity of the reflected light by the detector;

determining, via a microcontroller, the position of the rotating object according to the intensity of the detected light; and generating a signal that corresponds to the intensity of the detected light associated with the determined position of the rotating shaft, wherein the reflecting region has a feature configured to effect a change in the intensity of the reflected light as the rotating object rotates, wherein the detector is configured to operate at a frequency of at least 25 kHz to accurately follow the position of the rotating object, such that the determined position of the rotating object is determined virtually instantaneously as the rotating object rotates, and wherein the microcontroller is configured to determine the determined position and to utilize the determined position and the change in the signal to control operating characteristics of the engine, wherein the change in the signal is based on a shape of the rotating object.

18. The method of claim 17, wherein the operating characteristics of the engine comprise any one or more of the following:

adjusting the fuel amount delivered to a cylinder of the engine;

adjusting the fuel amount delivered to the cylinder of the engine at each revolution of the engine;

adjusting the fuel delivery timing to a cylinder of the engine;

adjusting the fuel delivery timing to the cylinder of the engine at each revolution of the engine;

adjusting the spark ignition timing to a cylinder of the engine;

adjusting the spark ignition timing to the cylinder of the engine at each revolution of the engine;

adjusting the spark ignition duration to a cylinder of the engine;

adjusting the spark ignition duration to the cylinder of the engine at each revolution of the engine;

determining a top dead center (TDC) position of a cylinder of the engine;

determining the TDC position of the cylinder of the engine at each revolution of the engine;

determining a fuel quality within a cylinder of the engine;

determining the fuel quality within the cylinder of the engine at each revolution of the engine;

determining a power stroke for a cylinder of the engine;

determining the power stroke for the cylinder of the engine at each revolution of the engine;

adjusting the fuel/air mixture or stoichiometry for a cylinder of the engine;

adjusting the fuel/air mixture or stoichiometry for the cylinder of the engine at each revolution of the engine;

storing historical engine and cylinder data and, utilizing such stored data for diagnosing wear of one or more engine components, identifying a leaky valve, distinguishing between a leaky intake or exhaust valve, predicting failure of one or more engine components, diagnosing crankshaft misalignment, diagnosing crankshaft and/or camshaft bearing wear or failure, and/or determining whether one cylinder is producing more or less power compared to another cylinder of the engine; and/or monitoring and/or diagnosing other functional aspects of an entire vehicle or device, aside from an engine or motor, such as diagnosing a dragging brake as a reaction of the motor and sending a warning regarding same.

* * * * *